United States Patent
Tamura et al.

(10) Patent No.: US 8,449,634 B2
(45) Date of Patent: May 28, 2013

(54) HYDROGEN GENERATING APPARATUS, METHOD OF OPERATING HYDROGEN GENERATING APPARATUS, AND FUEL CELL SYSTEM

(75) Inventors: Yoshio Tamura, Osaka (JP); Akinari Nakamura, Osaka (JP); Hideo Ohara, Osaka (JP); Masataka Ozeki, Osaka (JP)

(73) Assignee: Panasonic Corporation, Osaka (JP)

( * ) Notice: Subject to any disclaimer, the term of this patent is extended or adjusted under 35 U.S.C. 154(b) by 997 days.

(21) Appl. No.: 12/439,632

(22) PCT Filed: Sep. 21, 2007

(86) PCT No.: PCT/JP2007/068427
§ 371 (c)(1),
(2), (4) Date: Mar. 2, 2009

(87) PCT Pub. No.: WO2008/035776
PCT Pub. Date: Mar. 27, 2008

(65) Prior Publication Data
US 2010/0047636 A1    Feb. 25, 2010

(30) Foreign Application Priority Data
Sep. 22, 2006    (JP) .................... 2006-256808

(51) Int. Cl.
G05D 16/00    (2006.01)
(52) U.S. Cl.
USPC .................................... 48/197 R; 700/301
(58) Field of Classification Search
None
See application file for complete search history.

(56) References Cited

U.S. PATENT DOCUMENTS

| | | | | |
|---|---|---|---|---|
| 2001/0002248 A1* | 5/2001 | Ukai et al. | | 423/652 |
| 2003/0200939 A1* | 10/2003 | Hiltner et al. | | 123/3 |
| 2005/0106431 A1* | 5/2005 | Edlund et al. | | 429/22 |
| 2006/0057444 A1* | 3/2006 | Takagi et al. | | 429/20 |
| 2009/0081492 A1* | 3/2009 | Hasuka et al. | | 429/13 |

FOREIGN PATENT DOCUMENTS

| EP | 1 411 572 | 4/2004 |
|---|---|---|
| EP | 1 538 126 | 6/2005 |

(Continued)

OTHER PUBLICATIONS

Extended European Search Report, issued in European Patent Application No. 07 807 758.3, dated Mar. 6, 2012.

Primary Examiner — Imran Akram
(74) Attorney, Agent, or Firm — McDermott Will & Emery LLP

(57) ABSTRACT

A hydrogen generating apparatus of the present invention includes a controller (20) configured to, during a stop period, control a material gas feeding device (10) to feed a material gas to a gas passage which is located between the material gas feeding device (10) and a valve (16) to perform a maintaining process for maintaining a pressure in an interior of the gas passage at value which is not smaller than a first threshold which is an atmospheric pressure or larger. When the controller (20) detects there is an abnormality in the maintaining process, the controller (20) controls the material gas feeding device (10) and an ignition device (5A) to feed the material gas with an amount which is larger than an amount in a case where the controller detects there is no abnormality in the maintaining process, during a period which lapses from when the controller detects the abnormality until the ignition device starts an ignition operation in a start-up process.

13 Claims, 9 Drawing Sheets

FOREIGN PATENT DOCUMENTS

| | | |
|---|---|---|
| JP | 02-087480 | 3/1990 |
| JP | 2003-229156 | 8/2003 |
| JP | 2004-307236 | 11/2004 |
| JP | 2005-044653 | 2/2005 |
| JP | 2005-071934 | 3/2005 |
| JP | 2005-350300 | 12/2005 |
| JP | 2007-273171 | 10/2007 |
| WO | WO 2007069010 A2 * | 6/2007 |

* cited by examiner

HYDROGEN GENERATING APPARATUS, METHOD OF OPERATING HYDROGEN GENERATING APPARATUS, AND FUEL CELL SYSTEM

RELATED APPLICATIONS

This application is the U.S. National Phase under 35 U.S.C. §371 of International Application No. PCT/JP2007/068427, filed on Sep. 21, 2007, which in turn claims the benefit of Japanese Application No. 2006-256808, filed on Sep. 22, 2006, the disclosures of which Applications are incorporated by reference herein.

TECHNICAL FIELD

The present invention relates to a hydrogen generating apparatus, a method of operating the hydrogen generating apparatus, and a fuel cell system using the hydrogen generating apparatus. Particularly, the present invention relates to a hydrogen generating apparatus which is sealed under the state where a combustible gas is filled therein during a stop period and is configured to combust the sealed combustible gas in a start-up process for starting up the hydrogen generating apparatus, a method of operating the hydrogen generating apparatus, and a fuel cell system using the hydrogen generating apparatus.

BACKGROUND ART

A hydrogen generating apparatus including a reformer for generating a hydrogen-containing gas through a steam reforming reaction using as a material gas a hydrocarbon based gas such as a natural gas or LPG, is suitably used to generate the hydrogen-containing gas which is supplied to a fuel cell.

In a method of stopping the hydrogen generating apparatus, the hydrogen generating apparatus is sealed under the state the material gas is filled therein. There is proposed a hydrogen generating apparatus in which in order to prevent a negative pressure in the reformer which is generated according to a decrease in a temperature in the interior of the hydrogen generating apparatus after the sealing, the material gas is fed after a specified time to maintain the interior at a positive pressure (e.g., see patent document 1).

There is also disclosed that a plurality of valves are used to seal a space of a fuel cell system including a hydrogen generating apparatus and a material gas is fed to the hydrogen generating apparatus based on its internal pressure or its internal temperature to prevent generation of a negative pressure in the hydrogen generating apparatus, thereby maintaining the interior at a positive pressure after the hydrogen generating apparatus has become a stop state (see Patent document 2).

Patent document 1: Japanese Laid-Open Patent Application Publication: No. 2003-229156
Patent document 2: Japanese Laid-Open Patent Application Publication: No. 2005-44653

DISCLOSURE OF THE INVENTION

Problems to be Solved by the Invention

However, during the stop period of the hydrogen generating apparatus, for example, an abnormality occurs for a time in a material gas feeding system such as a city gas infrastructure, leading to a situation where the feeding of the material gas stops for a time or becomes insufficient.

When the above described abnormality occurs in the hydrogen generating apparatuses disclosed in Patent documents 1 and 2, the feeding of the material gas to the hydrogen generating apparatus in a stopped state becomes insufficient, and thereby the pressure in the interior of the hydrogen generating apparatus drops to an outside pressure or lower, causing a possibility that air enters the hydrogen generating apparatus. In particular, since a combustor is connected to atmosphere, it is highly possible that air enters through a valve provided in close proximity to the combustor. As a result, even if the material gas is fed to the combustor and the combustor starts combustion in subsequent ignition operation in the case where the above described abnormality occurs, the material gas is fed with an amount that is less than a combustibility limit, leading to a failure in the combustion of the material gas.

Accordingly, an object of the present invention is to enable a hydrogen generating apparatus to reduce a possibility that an abnormality occurs in a combustion start operation in a combustor in a start-up process even if an abnormality occurs in a maintaining process for maintaining the sealed state of the hydrogen generating apparatus by feeding a material gas to the hydrogen generating apparatus as desired, in the hydrogen generating apparatus which is sealed under the state where a combustible gas is filled therein during a stop period, and is configured to combust the sealed combustible gas in the start-up process, and to provide a method of operating the hydrogen generating apparatus and a fuel cell system using the hydrogen generating apparatus. As used herein, the term "stop period" refers to a period from when the hydrogen generating apparatus is sealed until a start-up command is generated, and the term "start-up process" refers to a process in a period from when the start-up command is generated until the operation of at least a reformer has become a steady state.

Means for Solving the Problem

To solve the above described problems, a hydrogen generating apparatus of first invention of the present invention comprises a reformer configured to generate a hydrogen-containing gas from a material gas through a reforming reaction; a material gas feeding passage through which the material gas is fed to the reformer; a material gas feeding device which is provided on the material gas feeding passage and is configured to control feeding of the material gas to the reformer; a combustor configured to combust a gas discharged from the reformer; an ignition device provided in the combustor; a combustible gas feeding passage through which the gas discharged from the reformer is fed to the combustor; a valve provided in the combustible gas feeding passage; and a controller configured to, during a stop period in which a reforming reaction in the reformer is in a stopped state, perform a maintaining process in such a manner that the material gas feeding device is controlled to feed the material gas to a gas passage which is located between the material gas feeding device and the valve to maintain a pressure in an interior of the gas passage at a value which is not smaller than a first threshold which is an atmospheric pressure or larger; when the controller detects there is an abnormality in the maintaining process, the controller controls the material gas feeding device and the ignition device to feed the material gas with an amount which is larger than an amount in a case where the controller detects there is no abnormality in the maintaining process, during a period which lapses from when the controller detects the abnormality until the ignition device starts an ignition operation in a start-up process for starting the reforming reaction in the reformer.

In such a configuration, even if air enters the combustible gas passage through the combustor due to the abnormality in the maintaining process, the ignition operation can start after the material gas feeding device feeds the material gas with an amount larger than usual before the ignition operation starts to reduce air concentration in the combustible gas feeding device. This makes it possible to reduce a possibility that an abnormality occurs in the combustion operation of the combustor in the start-up process even if the abnormality occurs in the maintaining process. As defined herein, the gas passage which is located between the material gas feeding device and the valve includes a portion of the material gas feeding passage which is located downstream of the material gas feeding device, a gas passage inside the reformer, and a portion of a combustible gas feeding passage located upstream of the valve.

In the hydrogen generating apparatus of second invention of the present invention, when the controller detects the abnormality in the maintaining process, the controller may causes the material gas feeding device to feed the material gas to the reformer and cause the ignition device to start the ignition operation at a time later than a time when the ignition device starts the ignition operation in a case where there is no abnormality in the maintaining process, in the start-up process.

In the hydrogen generating apparatus of third invention of the present invention, when the controller detects the abnormality in the maintaining process, the controller may control the material gas feeding device to feed the material gas with an amount required to purge a gas remaining in the gas passage during a period from when the controller detects the abnormality until the ignition device starts the ignition operation in the start-up process. In such a configuration, since the ignition operation can start after the gas passage extending from the reformer to the combustor surely has become a material gas atmosphere, the possibility that an abnormality occurs in the combustion operation of the combustor in the start-up process can be further reduced.

In the hydrogen generating apparatus of fourth invention of the present invention, when the controller detects that a first ignition operation of the ignition device in the start-up process is an ignition failure and detects the abnormality in the maintaining process, the controller may control the material gas feeding device and the ignition device to feed the material gas with an amount which is larger than an amount in the case where the controller detects there is no abnormality in the maintaining process during a period which lapses from when the ignition device stops the ignition operation due to the ignition failure until the ignition device re-starts the ignition operation. In such a configuration, even though the abnormality in the maintaining process is detected, the present invention is carried out only when the ignition failure in subsequent ignition operation is confirmed. Therefore, wasting of the material gas is lessened as compared to the case where the material gas is always fed with an amount larger than usual before the ignition operation after the abnormality in the maintaining process is detected. As a result, efficiency of the hydrogen generating apparatus is improved.

In the hydrogen generating apparatus of fifth invention of the present invention, when the controller detects that the first ignition operation is an ignition failure and detects the abnormality in the maintaining process, the controller may cause the material gas feeding device to feed the material gas to the reformer and cause the ignition device to re-start the ignition operation at a time later than a time when the ignition device re-starts the ignition operation in the case where there is no abnormality in the maintaining process.

The hydrogen generating apparatus of sixth invention of the present invention, may further comprise a first pressure detector configured to detect a pressure in an interior of the gas passage; and the abnormality in the maintaining process may be an abnormality occurring in the pressure detected by the first pressure detector during the stop period.

The hydrogen generating apparatus of seventh invention of the present invention, may further comprise a first pressure detector configured to detect a pressure in an interior of the gas passage; and the abnormality in the maintaining process may be that the pressure detected by the first pressure detector continues to be lower than the first threshold for a predetermined determination time or longer during the stop period. In such a configuration, since the outside air enters the gas passage according to a pressure difference, the abnormality in the maintaining process can be detected accurately.

The hydrogen generating apparatus of eighth invention of the present invention, may further comprise a first pressure detector configured to detect a pressure in an interior of the gas passage; and when a second threshold is a value which is not smaller than an atmospheric pressure and is smaller than the first threshold, the abnormality in the maintaining process may be that the pressure detected by the first pressure detector is not higher than the second threshold during the stop period. In such a configuration, since the outside air enters the gas passage according to a pressure difference, the abnormality in the maintaining process can be detected accurately.

The hydrogen generating apparatus of ninth invention of the present invention may further comprise a first pressure detector configured to detect a pressure in an interior of the gas passage; wherein when a second threshold is a value which is not smaller than an atmospheric pressure and is smaller than the first threshold, the abnormality in the maintaining process is that the pressure detected by the first pressure detector is not higher than the second threshold after a start-up command is generated. Thus, the abnormality in the maintaining process can be detected accurately even after the start-up command is generated, in a period before the start of the ignition operation as well as during the stop period.

The hydrogen generating apparatus of tenth invention of the present invention may further comprise a second pressure detector configured to detect a pressure in an interior of a portion of the material gas feeding passage which is located upstream of the material gas feeding device in a flow direction of the material gas; wherein the abnormality in the maintaining process may be that the pressure detected by the second pressure detector has an abnormality during the stop period. In such a configuration, the abnormality in the maintaining process due to the abnormality in the material gas feeding system can be detected.

In the hydrogen generating apparatus of eleventh invention of the present invention, the abnormality in the maintaining process may be that electric power supply is cut off at least for a time in the stop period. In such a configuration, the abnormality in the maintaining process due to the fact that the material gas feeding device does not operate because the electric power supply is cut off can be detected.

A fuel cell system of twelfth invention of the present invention comprises the hydrogen generating apparatus of the above invention; and a fuel cell configured to generate electric power using the hydrogen-containing gas supplied from the hydrogen generating apparatus. In such a configuration, even if there is an abnormality in the maintaining process in the hydrogen generating apparatus, a possibility that some troubles occurs in the start-up of the fuel cell system due to the abnormality in the combustion operation of the combustor in the start-up process can be reduced.

In the fuel cell system of thirteenth invention of the present invention, the combustible gas feeding passage may be a passage through which an anode off gas is fed from the fuel cell to the combustor. In such a configuration, the anode gas of the fuel cell can be efficiently used.

A method of operating a hydrogen generating apparatus of fourteenth invention of the present invention including a reformer configured to generate a hydrogen-containing gas from a material gas through a reforming reaction; a material gas feeding passage through which the material gas is fed to the reformer; a material gas feeding device which is provided on the material gas feeding passage and is configured to control feeding of the material gas to the reformer; a combustor configured to combust a gas discharged from the reformer; an ignition device provided in the combustor; a combustible gas feeding passage through which the gas discharged from the reformer is fed to the combustor; and a valve provided in the combustible gas feeding passage; comprises during a stop period when a reforming reaction in the reformer is in a stopped state, performing a maintaining process in such a manner that the material gas feeding device is caused to feed the material gas to a gas passage which is located between the material gas feeding device and the valve to maintain a pressure in an interior of the gas passage at a value which is not smaller than a first threshold which is an atmospheric pressure or larger; and when it is detected there is an abnormality in the maintaining process, controlling the material gas feeding device and the ignition device to feed the material gas to the gas passage with an amount which is larger than an amount in a case where it is detected that there is no abnormality in the maintaining process, during a period which lapses from when the abnormality is detected until the ignition device starts an ignition operation in a start-up process.

In such a configuration, even if air enters the combustible gas passage through the combustor due to the abnormality in the maintaining process, the ignition operation can start after the material gas feeding device feeds a material gas with an amount larger than usual before the ignition operation starts to reduce air concentration in the combustible gas feeding device. This makes it possible to reduce a possibility that an abnormality occurs in the combustion operation of the combustor in the start-up process even if the abnormality occurs in the maintaining process.

Effects of the Invention

In accordance with the present invention, in a hydrogen generating apparatus which is sealed under the state where a combustible gas is filled therein during a stop period and the sealed combustible gas is combusted in a start-up process, a possibility that an abnormality occurs in a combustion operation in a combustor in a start-up process can be reduced even if the abnormality occurs in a maintaining process for maintaining the sealed state by feeding the material gas as desired.

Figure 1:
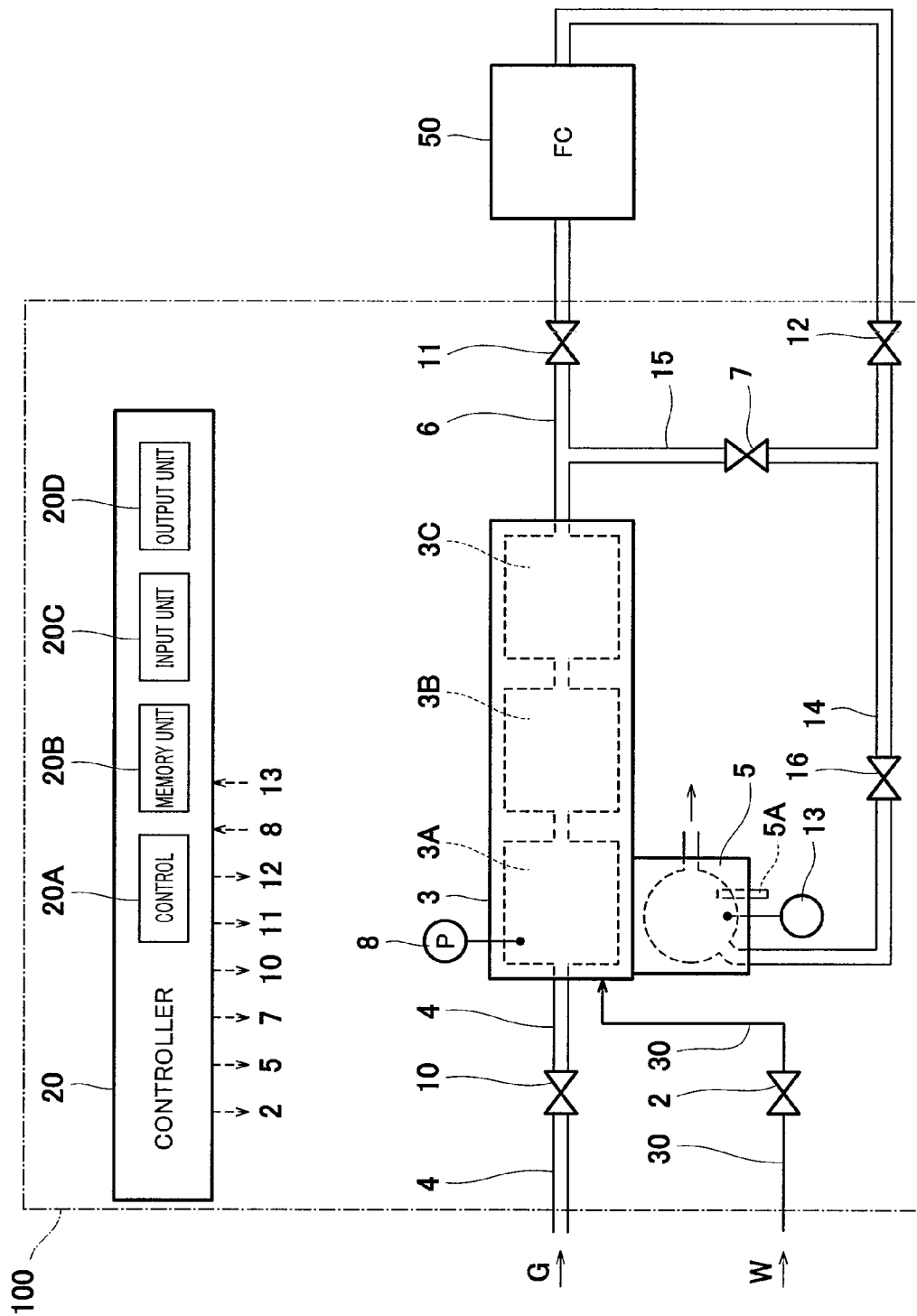
FIG. 1 is a schematic view showing a schematic configuration of a fuel cell system according to Embodiment 1 of the present invention.

EXPLANATION OF REFERENCE NUMERALS 2 water supply device
3 hydrogen generator
3A reformer
3B shift converter
3C CO remover
4 material gas feeding passage
5 combustor
5A ignition device
6 fuel gas feeding passage
7 valve
8 first pressure detector
10 material gas feeding device
11 valve
12 valve
13 flame detector
14 off gas feeding passage
15 bypass passage
16 valve
18 second pressure detector
20 controller
20A control unit
20B memory unit
20C input unit
20D memory unit
30 water supply passage
50 fuel cell (FC)
100, 101 hydrogen generating apparatus
M1 first threshold
M2 second threshold
S step
T time
T0 determination time
T1 delay time
V integrated flow rate
V1 air supply amount
P1, P2, detected pressure

BEST MODE FOR CARRYING OUT THE INVENTION

Hereinafter, best mode for carrying out the present invention will be described with reference to the drawings.

Embodiment 1

FIG. 1 is a schematic view showing a schematic configuration of a fuel cell system of Embodiment 1. The fuel cell system is configured to include a hydrogen generating apparatus 100 and a fuel cell 50.

The fuel cell (FC) 50 is an apparatus configured to generate electric power through a reaction between an anode gas and a cathode gas using a hydrogen-containing gas supplied from the hydrogen generating apparatus 100 as the anode gas and an oxidizing gas such as air supplied separately as the cathode gas. Whereas in this embodiment, a polymer electrolyte fuel cell (PEFC) is used, a phosphoric acid fuel cell (PAFC), a molten carbonate fuel cell (MCFC), or a solid oxide fuel cell (SOFC) may be used.

The hydrogen generating apparatus 100 includes a hydrogen generator 3 configured to generate a hydrogen-containing gas from a material gas through a steam reforming reaction, a material gas feeding passage 4 through which the material gas is fed to the hydrogen generator 3, a material gas feeding device 10 which is provided in the material gas feeding passage 4 and is configured to control a feeding amount of the material gas to the hydrogen generator 3, a fuel gas feeding passage 6 through which the hydrogen-containing gas discharged from the hydrogen generator 3 is fed to the fuel cell 50 as the fuel gas, a valve 11 for opening and closing the fuel gas feeding passage 6, a combustor 5 for combusting a combustible gas, an ignition device 5A provided at the combustor, an off gas feeding passage 14 which is a combustible gas feeding passage of the present invention, through which a combustible off gas discharged from the hydrogen generator 3 or the fuel cell 50 is fed to the combustor 5, a valve 12 for opening and closing the off gas feeding passage 14, a bypass passage 15 which branches from the fuel gas feeding passage 6 and connects the fuel gas feeding passage 6 to the off gas feeding passage 14 so as to bypass the fuel cell 50, a valve 7 for opening and closing the bypass passage 15, a valve 16 which is a valve of the present invention, which is provided at a portion of the off gas feeding passage 14 which is located between a merging point of the bypass passage 15 and the off gas feeding passage 14, and the combustor 5, a first pressure detector 8 for detecting a pressure in the interior of the hydrogen generator 3, a water supply passage 30 through which water is supplied to the reformer 3A, a water supply device 2 which is provided on the water supply passage 30 and is configured to control a supply amount of the water to the hydrogen generator 3, and a controller 20.

The material gas feeding passage 4 is connected to a feeding system of a material gas G. The water supply passage 30 is connected to a water supply system of water W.

As the valve 11 and the valve 7, on-off valves are used, but three-way valves may be used. That is, a connecting portion between the fuel gas feeding passage 6 and the bypass passage 15 is formed by the valve 11 which is the three-way valve. In this case, the valve 11 also serves as the valve 7, and therefore, the valve 7 may be omitted. That is, by a switching operation of the valve 11, a destination to which the gas discharged from the hydrogen generator 3 is sent is switched between the fuel cell 50 and the combustor 5. During a stop process of the hydrogen generating apparatus of this embodiment, a connecting destination of the valve 11 is switched from the fuel cell 50 side to the bypass passage 15 side and the valve 12 and the valve 16 are closed, forming a sealed area including the hydrogen generator 3, the fuel gas feeding passage 6, the bypass passage 15, and the off gas feeding passage 14 in an area defined by the material gas feeding device 10, the valve 11, the valve 12, and the valve 16. In other words, the gas passage of the present invention which is formed between the material gas feeding device 10 and the valve 16 corresponds to the sealed area. Also, a space including the fuel cell 50, the fuel gas feeding passage 6, and the off gas feeding passage 14 is a closed space.

As the material gas feeding device 10, a flow control valve which is capable of opening and closing the material gas feeding passage 4 and of controlling a flow rate is suitably used. For example, in a case where the material gas feeding device 10 is applied with a pressure of about 1 to 2 kPa by the material gas feeding system connected to the material gas feeding passage 4, a flow rate control valve having a pressure resistance of about 10 kPa which is sufficient to seal it is suitably used. The desired pressure resistance varies depending on the material gas feeding system, and therefore, an instrument according to the pressure resistance may be used as the material gas feeding device 10. In a case where the feeding pressure of the material gas feeding system is lower than the feeding pressure required for the operation of the hydrogen generating apparatus 100, the material gas feeding device 10 is desirably configured to be capable of controlling the feeding pressure of the material gas flowing in the material gas feeding passage 4. For example, the material gas feeding device 10 is desirably configured to have a, for example, plunger pump.

The first pressure detector 8 is a pressure meter which is capable of detecting a pressure in the interior of the hydrogen generator 3 and outside (outside pressure). For example, in a case where the pressure in the interior of the hydrogen generator 3 and the outside pressure are several tens kPa, a pressure meter with an upper limit of 50 kPa is suitably used. As defined herein, the pressure in the interior of the hydrogen generator 3 which is higher than the outside pressure, is a positive pressure.

The first pressure detector 8 may be disposed to be capable of detecting the pressure in the gas passage located between the valve 16 and the material gas feeding device 10. Whereas the first pressure detector 8 is provided in the interior of the hydrogen generator 3 herein, it may be provided anywhere so long as it is disposed in an area (sealed area) which includes the hydrogen generator 3 and is defined by the material gas feeding device 10 and the valve 16.

As the water supply device 2, a flow rate control valve capable of opening and closing the water supply passage and of controlling a flow rate is suitably used. Since a water supply system connected to the water supply passage 30 applies to the water supply device 2 a pressure of several kPa to several tens kPa, an instrument capable of opening and closing under such a pressure is suitably used. A desired pressure resistance varies depending on the water supply system, and therefore an instrument according to the pressure resistance may be used as the water supply device 2.

As the valve 16, an electromagnetic valve is suitably used. However, the valve 16 may have any configuration so long as it is capable of opening and closing the fuel gas feeding passage 6. Since the gas flowing in the fuel gas feeding passage 6 applies to the valve 16 a pressure of several kPa to several tens kPa, a valve capable of opening and closing under such a pressure is suitably used. A desired pressure resistance varies depending on the configuration of the hydrogen generating apparatus 100, and therefore a valve according to the pressure resistance may be used as the valve 16.

The hydrogen generator 3 is configured to be capable of utilizing combustion heat of the combustor 5. The hydrogen generator 3 is configured to include a reformer 3A for generating a hydrogen-containing gas through a steam reforming reaction between the material gas and the water, a shift converter 3B for reducing a carbon monoxide concentration of the hydrogen-containing gas through a shift reaction, and a CO remover 3C for further reducing the carbon monoxide in the hydrogen-containing gas after the shift reaction through an oxidation reaction such that the reformer 3A, the shift converter 3B, and the CO remover 3C are coupled. The reformer 3A corresponds to the reformer of the present invention.

As the reforming catalyst of the shift converter 3A, a catalyst containing Ru as a major component is used. However, the reforming catalyst is not particularly limited so long as it enables the reforming action to occur. For example, a reforming catalyst containing noble metal such as Pt or Rh, Ni, etc may be used.

As the shift catalyst of the shift converter 3B, a catalyst containing Pt as a major component is used. However, the shift catalyst is not particularly limited. For example, a shift catalyst containing Cu—Zn or the like may be used.

As the oxidation catalyst of the CO remover 3C, a catalyst containing Pt as a major component is used. The oxidation catalyst is not particularly limited. For example, an oxidation catalyst containing Ru or the like may be used.

In this embodiment, the fuel cell 50 is the PEFC. To prevent deterioration of the catalytic performance of the PEFC, the carbon monoxide concentration is reduced by the shift converter 3B and the CO remover 3C. Therefore, depending on the destination to which the hydrogen-containing gas is supplied, the shift converter 3B and the CO remover 3C may be omitted.

The material gas feeding passage 4 is formed by a pipe member such as a gas hose or a stainless pipe. The material gas feeding passage 4 may be formed to have any configuration or may be made of any material so long as leakage of the material gas does not occur under the material gas feeding pressure. It is desired that the material of the material gas feeding passage 4 does not contain a substance which poisons the catalyst inside the hydrogen generator 3, but it may contain such a substance so long as scattering or elusion of the substance will not occur.

The fuel gas feeding passage 6, the off gas feeding passage 14, and the bypass passage 15 may be formed to have any configuration or may be made of any material so long as leakage of the material gas and the hydrogen-containing gas does not occur under the feeding pressures of the material gas and the hydrogen-containing gas. Since the hydrogen-containing gas generated in the hydrogen generator 3 has a high temperature which is near several tens ° C. to two hundreds ° C., it is desired that the fuel gas feeding passage 6, the off gas feeding passage 14, and the bypass passage 15 may be formed of a heat-resistance material. For example, the stainless pipes are suitably used.

The combustor 5 includes a burner for combusting the combustible gas such as the material gas or the hydrogen-containing gas, an ignition device 5A, and an air supply device such as a fan or a pump for supplying an oxidizing gas such as air (not shown). To be specific, the burner is suitably a diffusive combustion type burner but may be formed to have any configuration. For example, the burner may be a pre-mixing type burner As the ignition device 5A, an igniter which is an electric combustion device is suitably used. Any ignition device may be used so long as it is capable of igniting the material gas.

As the air supply device, a sirocco fan is suitably used. This can supply heat required for the catalytic action in the hydrogen generator 3.

A flame detector 13 is disposed in the combustor 5. As the flame detector 13, a known flame detector such as a flame rod type flame detector may be used. The flame detector 13 is capable of detecting phenomena of ignition failure such as flame extinguishment or fluctuation in the flame in the combustor 5.

The controller 20 is constituted by a computer such as a microcomputer, and is configured to include a control unit 20A for controlling the valve 7, the material gas feeding device 10, the valve 11, the valve 12, the valve 16, the combustor 5 including the ignition device 5A, and the water supply device 2, a memory unit 20B, an input unit 20C constituted by an input device such as a touch panel or a key board, and an output unit 20D constituted by an output device such as a liquid crystal panel, a printer, or a light emitter. The controller 20 is configured to obtain pressure information of the first pressure detector 8 and the flame information of the flame detector 13.

As used herein, the term "controller" encompasses not only a single controller but also a controller group in which a plurality of controllers cooperate to execute control. Therefore, the controller 20 need not be constituted by a single controller but may be a plurality of controllers which are distributed and are configured to cooperate with each other to control the operation of the hydrogen generating apparatus 100.

Figure 2:
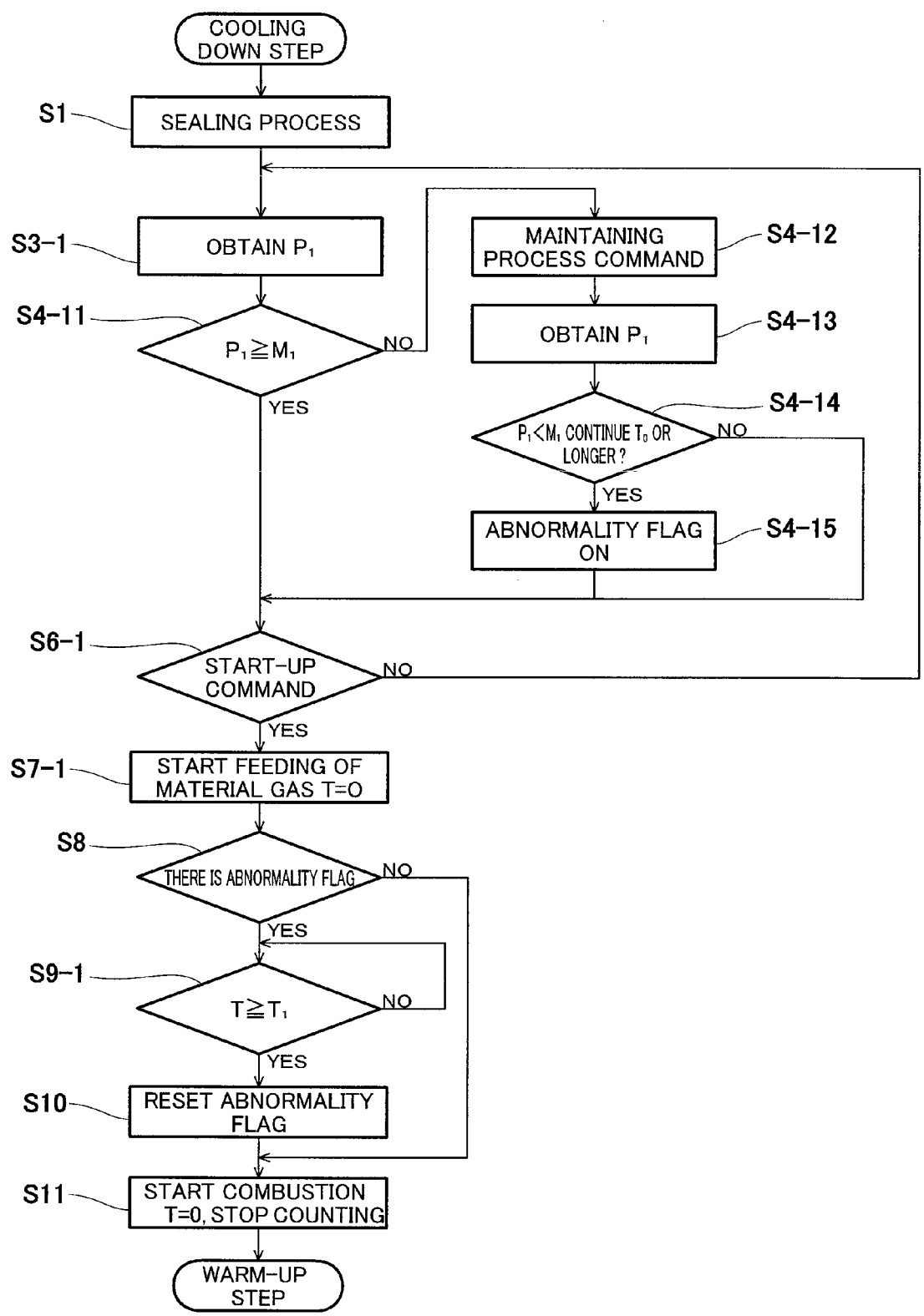
FIG. 2 is a flowchart showing an example of the operation during a stop period and the operation in a start-up process of the fuel cell system of FIG. 1.

Subsequently, the operation in the stop process, the operation during the stop period, and the operation in the start-up process of the hydrogen generating apparatus 100 which is the feature of the present invention will be described. These operations are executed under control of the controller 20. FIG. 2 is a flowchart showing an example of the operation in the stop process, the operation during the stop period, and the operation in the start-up process of the hydrogen generating apparatus according to Embodiment 1. As used herein, the start-up process refers to a process for causing the reformer 3A to start the reforming reaction.

As shown in FIG. 2, in the stop process in the hydrogen generator 3, the water supply device 2 is closed to stop the supply of water to the hydrogen generator 3. When the temperature in the interior of the hydrogen generator 3 has decreased to a temperature at which carbon deposition does not occur even if the material gas is fed thereto, a sealing process is performed in step (sealing process step) S1 in which the material gas feeding device 10, the valve 11, the valve 12, the valve 7, and the valve 16 are controlled so that the material gas is filled into the sealed area including the hydrogen generator 3 and sealed. To be specific, the valve 11 and the valve 12 are closed and the valve 16 is opened, and in this state, the material gas feeding device 10 and the valve 7 are opened to purge the gas remaining in the interior of the hydrogen generating apparatus 100 with the material gas. That is, the purge operation of the present invention is performed. In this case, the material gas is discharged from the combustor 5 to outside. Therefore, by driving the air supply device for the combustor 5 to dilute the material gas to a level less than the combustibility limit and discharging the diluted material gas, an unexpected combustion of the material gas in outside area can be avoided.

When the material gas feeding device 10 and the valve 16 are closed, the area (sealed area) defied by the material gas feeding device 10, the valve 11, the valve 12, and the valve 16, including the hydrogen generator 3 is sealed under the state where the material gas is filled in the sealed area.

Since the feeding pressure of the material gas from the material gas feeding system is about 1 to 2 kPa, the material gas is sealed in the sealed space under a pressure which is 1 to 2 kPa higher than the outside pressure.

The hydrogen generator 3 is provided with a passage connected to outside to supply an oxidant to the CO remover 3C. The passage is also closed. Thereby, the stop process of the hydrogen generating apparatus of the present invention and the fuel cell system including the hydrogen generating apparatus is completed. The following period which lapses until a start-up command is output from the controller 20 is defined as the stop period of the hydrogen generating apparatus and the fuel cell system in the present invention.

The start-up command may be output from the controller 20 based on, for example, the user's input operation of a start-up switch provided at an input device such as a remote controller (not shown), or automatically output from the controller 20 based on external electric power load, time, etc.

After the completion of the stop process, the hydrogen generator 3 has a temperature which is higher than the outside temperature. Therefore, the temperature of the hydrogen generator 3 decreases with time, so that the volume of the gas in the sealed area shrinks. Accordingly, until the temperature of the hydrogen generator 3 decrease to the outside temperature in the stop period, the maintaining process is performed in such a manner that the material gas feeding device 10 is controlled suitably to feed the material gas to the interior of the sealed area to increase the pressure in the interior of the sealed area and the outside pressure up to a first threshold M1 or higher and the increased pressures are maintained.

The volume of the gas in the sealed area may sometimes shrink for some reason such as fluctuation in the outside temperature even after the temperature of the hydrogen generator 3 has decreased to the outside temperature. Accordingly, during the stop period after the temperature of the hydrogen generator 3 has decreased to the outside temperature, the maintaining process is performed.

As defined in the present invention, the stop period refers to a period from when the sealing process is performed for the hydrogen generating apparatus 100 until the controller 20 outputs the start-up command. The maintaining process of the present invention is a maintaining process during the stop period.

In this embodiment, when the detected pressure (pressure information) P1 which is detected by the first pressure detector 8 is lower than the first threshold M1, the maintaining process is performed in such a manner that the material gas feeding device 10 is opened to feed the material gas to the sealed area. When the detected pressure (pressure information) P1 reaches the first threshold M1 or higher, the material gas feeding device 10 is closed, forming the sealed state.

The first threshold M1 is pre-input with the input unit 20C and pre-stored in the memory unit 20B. The first threshold M1 is set to a value of a pressure lower than a pressure resistance of the sealed area. If the material gas feeding device 10 does not include a pressure increasing device such as the plunger pump, the first threshold M1 is set to a value of a pressure which is lower than a pressure difference between the feeding pressure of the material gas feeding system and the outside pressure. Therefore, the first threshold M1 is suitably set according to the configuration of the hydrogen generating apparatus 100, the feeding pressure of the material gas feeding system connected to the material gas feeding passage 4, and the detecting accuracy of the first pressure detector 8. For example, the first threshold M1 is suitably 0.5 kPa.

In the hydrogen generating apparatus 100 of the present invention, it is detected whether or not there is an abnormality in the maintaining process. If the abnormality is detected, an abnormality flag is stored in the memory unit 20B. If there is an abnormality flag when a next start-up command is output from the controller 20, the ignition device does not start an ignition operation immediately even though the material gas feeding device 10 and the valve 16 are opened and the material gas feeding device 10 starts feeding of the material, but starts the ignition operation after the material is fed with an amount which is larger than the amount in the case where there is no abnormality flag.

To be specific, control is executed according to the following flow. First, in step S3-1, the controller 20 obtains a detected pressure P1 of the first pressure detector 8. In step S4-11, the controller 20 compares the detected pressure P1 to the first threshold M1, and outputs a maintaining process command (step S4-12) to perform the maintaining process, when the detected pressure P1 is lower than the first threshold M1. Then, the controller 20 newly obtains a detected pressure P1 of the first pressure detector 8 (step S4-13), and then determines whether or not the detected pressure P1 continues to be lower than the first threshold M1 for a predetermined determination time T0 or longer in step S4-14. The time is measured by a timer built in the controller 20 with transition of the detected pressure P1.

The determination time T0 is pre-input with the input unit 20C and pre-stored in the memory unit 20B. The determination time T0 is a time determined to be taken for the pressure in the interior of the hydrogen generator 3 to decrease to outside pressure or lower. Therefore, the determination time T0 is suitably set according to the configuration of the sealed area. For example, the determination time T0 is suitably 3 minutes.

If it is determined that the detected pressure P1 continues to be lower than the first threshold M1 for the predetermined time T0 or longer, the controller 20 determines that there is an abnormality in the maintaining process and causes the memory unit 20B to turn ON the abnormality flag (flag) to store the abnormality of the maintaining process therein, in step S4-15.

The maintaining process steps and the abnormality detecting steps therefor S3-1, S4-11, S4-12, S4-13, S14-14, and S14-15 are repeated, until the start-up command is output in step S6-1. It should be noted that since the maintaining process steps and the abnormality detecting steps therefor S3-1, S4-11, S4-12, S4-13, S14-14, and S14-15 need not be repeated when the abnormality flag is in ON-state, repeating of the steps S3-1, S4-11, S4-12, S4-13, S14-14, and S14-15 may be omitted.

When the controller 20 outputs the start-up command in step S6-1, the hydrogen generator 3 starts the start-up process for starting the steam reforming reaction.

First, in step (material gas feeding process step) S7-1, the material gas feeding device 10 and the valve 16 are opened to start the feeding of the material gas. Then, the timer built in the controller 20 starts counting from T=0 a lapse of time T from start of the feeding of the material gas (hereinafter referred to as a lapse time).

It is desired that the material gas feeding device 10 be first opened and then the valve 16 be opened. This is because if the valve 16 is opened first, outside air may enter the sealed area through the combustor 5. If the valve 16 is opened first, the material gas feeding system is connected to the sealed area.

Therefore, entry of the outside air into the sealed area through the valve 16 is prevented when the valve 16 is opened.

In step S8, it is checked whether or not there is an abnormality flag. If there is no abnormality flag, the lapse time T is reset to zero, and counting is stopped in step (combustion process step) S11. In addition, the ignition device 5A starts the ignition operation, and the combustion starts. Thereby, heat is supplied to the hydrogen generator 3 and the hydrogen generator 3 transitions to a warm-up step. That is, the material gas feeding process step S7-1 and the combustion process step S11 are performed substantially at the same time. Therefore, the material gas filled in the sealed area during the stop state is combusted in the combustor 5 to generate combustion heat which is supplied to the hydrogen generator 3 as heat. As a result, utilization efficiency of the material gas increases and the hydrogen generating apparatus 100 can start-up in a short time.

The flame detector 13 detects the ignition state in step S11. If the flame detector 13 detects an ignition failure, the controller 20 stops the start-up process and causes the output unit 20D to display the ignition failure.

Alternatively, in step S11, the controller 20 may be configured to notify a remote spot that the ignition failure has occurred. For example, the control unit 20A is configured to have a transmission function. To be specific, the control unit 20A is coupled to a telephone line and a telephone number of a notification destination is pre-input to the control unit 20A with the input unit 20C. When the flame detector 13 detects the ignition failure, the controller 20A automatically dials the telephone number to notify the remote spot that the ignition failure has occurred. As the notification destination, a maintenance company or the like may be set.

On the other hand, if there is an abnormality flag in step S8, the combustion process step S11 is delayed until the lapse time T reaches predetermined delay time T1 in step (delay step) S9-1. This makes it possible to delay the start time of the combustion process step S11 in the case where there is an abnormality flag with respect to the start time of the combustion process step S11 in the case where there is no abnormality flag. During the delay time T1, the material gas is fed from the material gas feeding device 10 to the hydrogen generator 3, while air which is assumed to have entered the off gas feeding passage 14 is discharged from the combustor 5, so that air concentration in the interior of the off gas feeding passage 14 is reduced. This reduces a possibility that ignition failure occurs if the ignition device 5A starts the ignition operation after a lapse of the delay time T1.

In this case, as in step S1, the material gas may be diluted to a level less than the combustibility limit using the air supply device of the combustor 5 and the diluted material gas may be discharged to outside. This can avoid unexpected combustion of the material gas in the outside area.

The delay time T1 is pre-input with the input unit 20C and pre-stored in the memory unit 20B. The delay time T1 may be approximately set to a time taken for the event that the air which has entered the sealed area is discharged from the combustor 5 to the outside and the off gas feeding passage 14 has become a combustible gas atmosphere. Or, the delay time T1 may be desirably set to a time which lapses until the feeding amount of the material gas reaches the amount required to purge the gas remaining in the sealed area. To be specific, the delay time T1 can be calculated based on the flow rate of the material gas from the material gas feeding passage 4 and the volume of the gas passage inside the hydrogen generating apparatus 100. More suitably, the delay time T1 is set to a time taken to feed the material gas with an amount that is twice as large as the internal volume of the hydrogen generator 3. The delay time T1 is pre-stored in the memory unit 20A of the controller 20.

When the lapse time T after the start of feeding of the material gas reaches the predetermined delay time T1 or longer, the abnormality flag is reset in step S10 and the process moves to step S11.

In the manner as described above, the combustion starts after the combustor 5 has become a material gas combustible state even though there is an abnormality in the maintaining process. As a result, the hydrogen generating apparatus 100 of the present invention is capable of reducing a possibility that an abnormality occurs in the combustion operation of the combustor in the start-up process even though there is an abnormality in the maintaining process during the stop period.

Subsequently, the reforming operation and stop operation of the hydrogen generating apparatus 100 after the start-up process will be described.

The hydrogen generator 3 is heated by the combustion heat of the combustor 5.

The water supply device 2 is opened to supply the water from the water supply passage 30 to the hydrogen generator 3.

In the reformer 3A inside the hydrogen generator 3, the water is converted into steam, the steam is mixed with the material gas and the hydrogen-containing gas is generated through the steam reforming reaction. The reformer 3A is heated up to a predetermined temperature based on an activation temperature of the reforming catalyst. In this embodiment, the reformer 3A is heated up to about 650° C.

The hydrogen-containing gas is fed to the shift converter 3B, in which the carbon monoxide concentration of the hydrogen-containing gas is reduced through a shift reaction. The shift converter 3B is heated up to a predetermined temperature based on the activation temperature of the shift catalyst. In this embodiment, the shift converter 3B is heated up to about 200° C.

The hydrogen-containing gas discharged from the shift converter 3B is sent to the CO remover 3C, in which the carbon monoxide concentration of the hydrogen-containing gas is further reduced through an oxidation reaction of carbon monoxide. The CO remover 3C is heated up to a predetermined temperature based on the activation temperature of the oxidation catalyst. In this embodiment, the CO remover 3C is heated up to a temperature in a range of about 100 to 200° C.

After the temperatures of the respective reaction units of the hydrogen generating apparatus 100 are heated to the above described temperature ranges and the carbon monoxide concentration of the hydrogen-containing gas discharged from the CO remover 3C is sufficiently reduced, the hydrogen-containing gas is supplied to the fuel cell 50. To be specific, the valve 11 and the valve 12 are opened and the valve 7 is closed, so that the hydrogen-containing gas is supplied to the anode of the fuel cell 50 as the fuel gas. The oxidizing gas such as air is supplied separately to the cathode of the fuel cell 50. The fuel cell 50 carries out power generation through a cell chemical reaction.

The anode off gas which is discharged from the fuel cell 50 is fed to the combustor 5 through the off gas passage 14. In the combustor 5, the anode off gas is combusted.

In the stop operation of the hydrogen generating apparatus 100, the feeding of the material gas to the hydrogen generator 3 is stopped by closing the valve of the material gas feeding device 10 and the supply of the water to the hydrogen generator 3 is stopped by closing the valve of the water supply device 2. In addition, the power generation in the fuel cell 50 is stopped and the valve 11 and the valve 12 are closed to seal the anode passage of the fuel cell 50 with the fuel gas.

Then, the heat is removed from the hydrogen generator 3 by using the air supply device of the combustor 5. At the time point when the temperature of the hydrogen generator 3 has decreased to a predetermined temperature or lower, or after a lapse of a heat removal time when it is determined that the temperature of the hydrogen generator 3 has decreased to the predetermined temperature or lower, the material gas feeding device 10 and the valve 7 are opened so that the material gas is fed through the material gas feeding passage 4 to purge the gas remaining in the hydrogen generator 3. At this time, the air supply device of the combustor 5 may continue to operate so that the remaining gas is diluted to a level lower than the combustibility limit and the diluted gas may be discharged to outside.

When the gas remaining in the interior of the hydrogen generator 3 has been purged, the valve 16 is closed. Thereby, the gas passage including at least the hydrogen generator 3 in a range from the material gas feeding device 10 to the valve 16 is closed under the state where the material gas is filled in the hydrogen generator 3, completing the stop process.

Then, the hydrogen generating apparatus 100 transitions to the stop state, and in step S3-1, the pressure detecting step starts to maintain the gas passage inside the hydrogen generator 3 at a positive pressure.

In this embodiment, when there is an abnormality flag in the start-up process in step S6-1 and the following steps, the material gas is fed with an amount which is larger than the amount in the case where there is no abnormality flag in step S9-1. Alternatively, the material feeding process which is different from the normal maintaining process may be carried out before the start-up process, i.e., during the stop period based on the abnormality flag being in ON-state in step S4-15 so that the feeding amount of the material gas before the ignition device 5A starts the ignition operation is larger than the amount in the case where there is no abnormality flag.

For example, the controller 20 may be configured to detect that the abnormality flag is in ON-state in step S4-15 and to control a communication device (not shown) so as to notify the remote spot that the abnormality flag is in ON-state. The specific procedure takes place as described in step S11. Then, according to the notification, a maintenance operator may maintain the hydrogen generating apparatus 100. After that, the operator may operate the material gas feeding device 10 to feed to the hydrogen generator 3 the material gas with an amount for substantially enabling the purging of the gas remaining in the interior of the hydrogen generator 3 and may thereafter restore the hydrogen generating apparatus 100 to the stop state (stop period).

In this embodiment, the timer is used in step S9-1. That is, by delaying the time of the combustion process step S11 in the case where there is an abnormality flag, the material gas is fed with an amount which is larger than the amount in the case where there is no abnormality flag. Alternatively, in step S9-1, the material gas feeding device 10 may be controlled to increase the flow rate of the material gas so that the flow rate is larger than the flow rate in the start-up process in the case where there is no abnormality flag. For example, in the case where the material gas feeding device 10 is a flow rate valve, the flow rate of the material gas can be increased by increasing a valve opening degree. This can reduce the delay time T1 in step S9-1.

Embodiment 2

Figure 3:
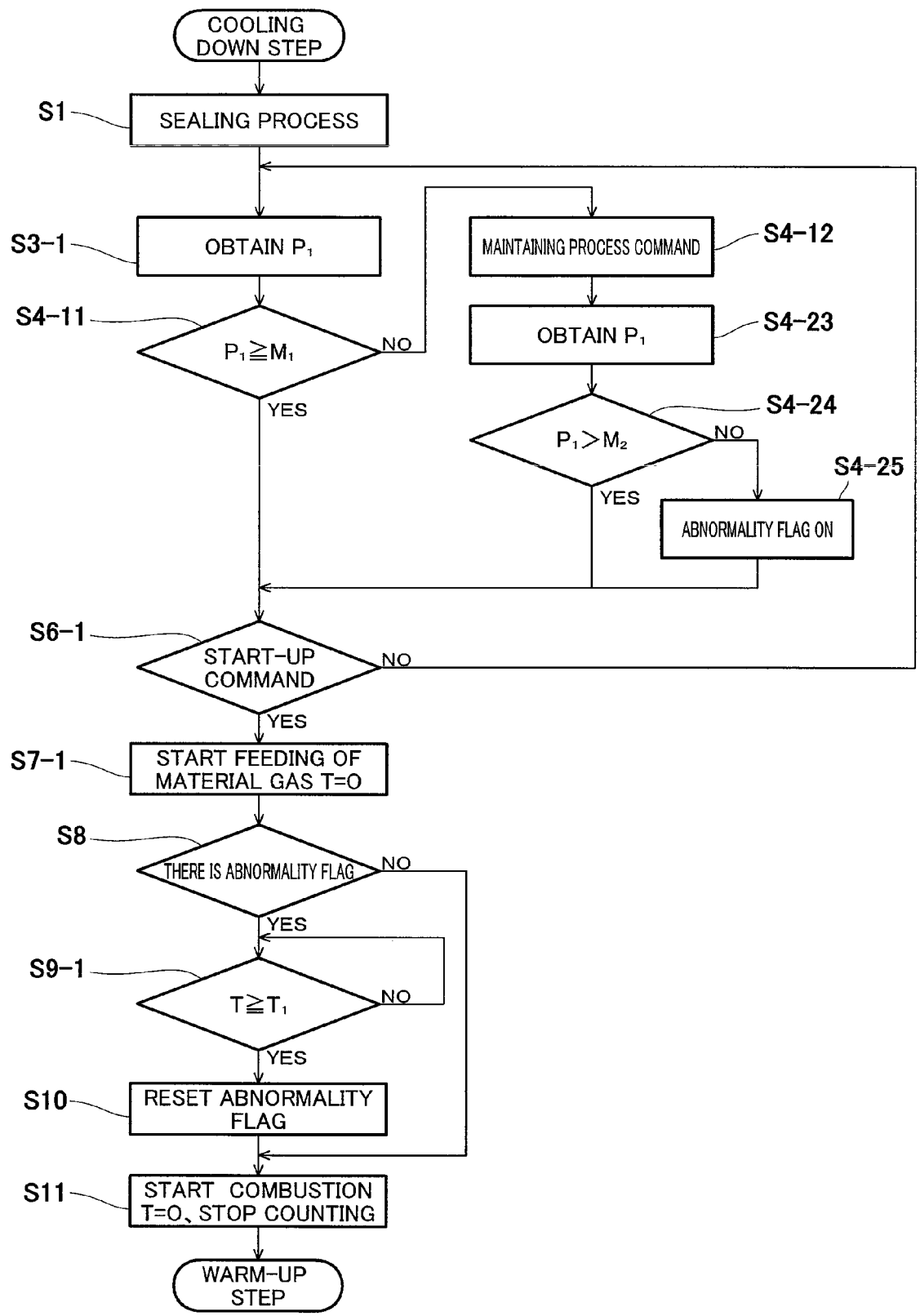
FIG. 3 is a flowchart showing an example of the operation during a stop period and the operation in a start-up process of a hydrogen generating apparatus according to Embodiment 2 of the present invention.

In Embodiment 2 of the present invention, an abnormality in the maintaining process is detected based on a second threshold M2 which is smaller than the first threshold M1 in the fuel cell system of Embodiment 1. FIG. 3 is a flowchart showing an example of the operation of a stop process, the operation during a stop period and the operation in a start-up process of a hydrogen generating apparatus according to Embodiment 2.

As shown in FIG. 3, in this embodiment, the abnormality detecting steps S4-13, S4-14, and S4-15 for the maintaining process in FIG. 2 are replaced by steps S4-23, S4-24, and S4-25. Since the configuration of the hardware of the fuel cell system and the hydrogen generating apparatus 100 is identical to that of Embodiment 1, it will not be further described. In FIG. 3, the same steps as those in FIG. 2 are designated by the same reference numbers and will not be further described. That is, the steps other than the steps S4-23, S4-24, and S4-25 are identical to those of FIG. 2.

As shown in FIG. 3, after the stop process is completed in the sealing process step S1, the hydrogen generating apparatus 100 transitions to the stop state. The controller 20 obtains the detected pressure P1 in step S3-1 and compares the detected pressure P1 to the first threshold M1 in step S4-11. The controller 20 outputs a maintaining process command (step S4-12) to perform the maintaining process, when the detected pressure P1 is lower than the first threshold M1. Then, the controller 20 newly obtains a detected pressure P1 of the first pressure detector 8 (step S4-23), and compares the detected pressure P1 to the second threshold M2 (step S4-24). When the detected pressure P1 is the second threshold M2 or lower, in step S4-25, the controller 20 causes the memory unit 20B to turn ON the abnormality flag to store the abnormality in the maintaining process.

The maintaining process steps and the abnormality detecting steps therefor S3-1, S4-11, S4-12, S4-23, S4-24, and S14-25 are repeated, until the start-up command is detected in step S6-1. It should be noted that since the abnormality detecting steps S4-23 to S4-25 for the maintaining process need not be repeated when the abnormality flag is in ON-state, repeating of the steps S4-23 to S4-25 may be omitted.

The second threshold M2 is pre-input with the input unit 20C and pre-stored in the memory unit 20B. The second threshold M2 is set to a value of a pressure with which it is determined that the feeding of the material gas is not carried out in the maintaining process step S4-12, considering factors such as accuracy of the first pressure detector 8. Therefore, the second threshold M2 is set to a value of a positive pressure and a value smaller than the first threshold M1. To be specific, the second threshold M2 is suitably set according to the configuration of the hydrogen generating apparatus 100 and the first threshold M1. For example, when the first threshold M1 is 0.5 kPa, the second threshold M2 is suitably 0.3 kPa.

In such a configuration, in a case where an abnormality that, the material gas feeding device 10 fails and a large amount of the material gas leaks, for example, the abnormality in the maintaining process can be detected in a shorter time without a lapse of the determination time T0.

Embodiment 3

Figure 4:
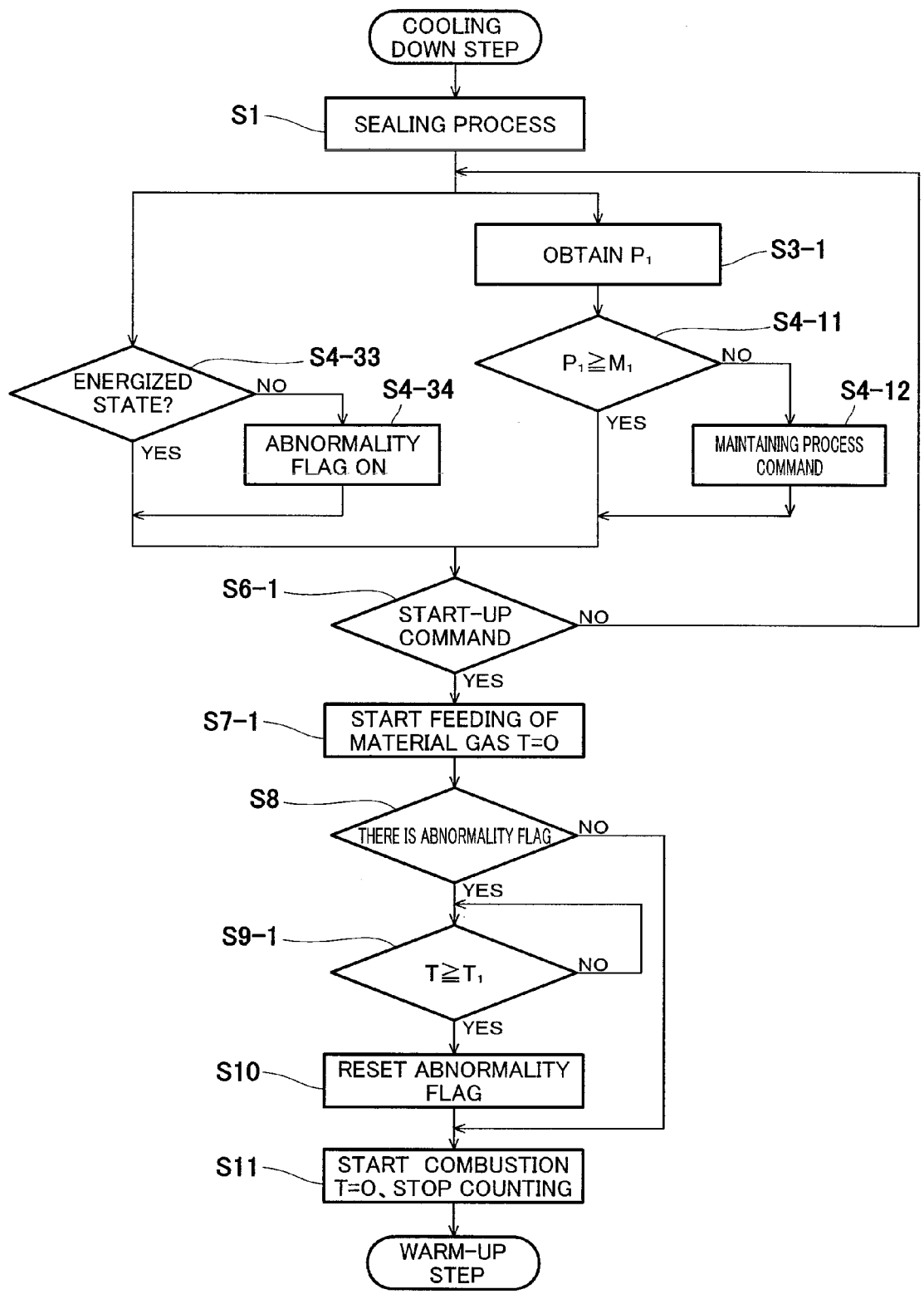
FIG. 4 is a flowchart showing an example of the operation during a stop period and the operation in a start-up process of a hydrogen generating apparatus according to Embodiment 3 of the present invention.

In Embodiment 3 of the present invention, in the fuel cell system of Embodiment 1, the abnormality in the maintaining process is detected based on an energized state of the hydrogen generating apparatus 100. FIG. 4 is a flowchart showing an example of the operation of a stop process, the stop process during a stop period and the operation in a start-up process of a hydrogen generating apparatus according to Embodiment 3 of the present invention.

As shown in FIG. 4, in this embodiment, the abnormality detecting steps S4-13, S4-14, and S4-15 for the maintaining process of FIG. 2 are replaced by steps S4-33 and S4-34. The configuration of the hardware of the fuel cell system and the hydrogen generating apparatus 100 is identical to that of Embodiment 1, and therefore will not be further described. In FIG. 4, the same steps as those in FIG. 2 are designated by the same reference numbers and will not be further described. That is, the steps other than the steps S4-33 and S4-34 are identical to those of FIG. 2.

As shown in FIG. 4, after the sealing process step S1, the maintaining process steps S3-1, S4-11, and S4-12 are performed. After the sealing process step S1, the energized state of the hydrogen generating apparatus 100 is detected in step S4-33, concurrently with the maintaining process steps. If it is detected that electric power supply is cut off at least for a moment, the controller 20 causes the memory unit 20B to turn ON the abnormality flag to store the abnormality in the maintaining process in step S3-34. In this manner, the state where the electric power supply is cut off can be detected as the abnormality in the maintaining process. Even when the abnormality in the maintaining process actually occurs due to the fact that the electric power supply is cut off and thereby the material gas feeding device 10 does not operate, the possibility that an abnormality occurs in the combustion operation in the combustor in the start-up process can be reduced.

The maintaining process steps and the abnormality detecting steps therefor S3-1, S4-11, S4-12, S4-33, and S4-34 are repeated, until the start-up command is detected in step S6-1. It should be noted that since the abnormality detecting steps S4-33 and S4-34 for the maintaining process need not be repeated when the abnormality flag is in ON-state, repeating of the steps S4-33 to S4-34 may be omitted.

The energized state is detected in the manner as described below, for example. To be specific, a voltage detector (not shown) for detecting a voltage from a system electric power supply is provided. If the voltage detector detects a voltage value with which it is presumed that an electric power failure has occurred and the controller 20 determines that the electric power failure is not instantaneous based on the fact that the voltage value continues for a predetermined time or longer, the controller 20 causes the memory unit 20B to turn ON the abnormality flag to store the abnormality in the maintaining process. In this manner, the controller 20 is configured to determine that electric power failure information such as voltage fluctuation in the electric power system or instantaneous electric power failure, which will not adversely affect the maintaining process, is the energized state. This makes it possible to avoid unwanted delay in the combustion process.

Embodiment 4

Figure 5:
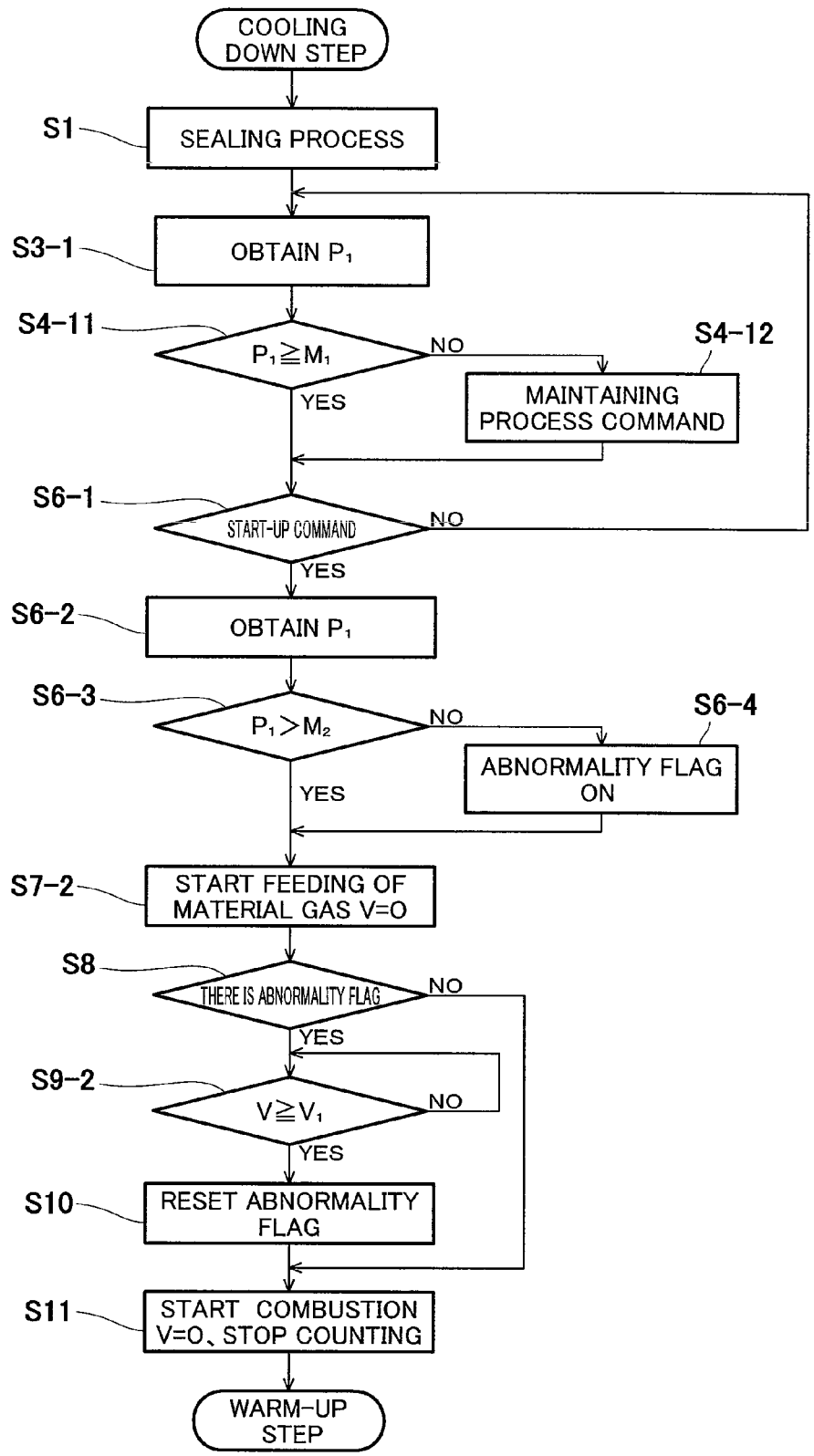
FIG. 5 is a flowchart showing an example of the operation during a stop period and the operation in a start-up process of a hydrogen generating apparatus according to Embodiment 4 of the present invention.

FIG. 5 is a flowchart showing an example of the operation of a stop process, the operation during a stop period and the operation in a start-up process of a hydrogen generating apparatus according to Embodiment 4 of the present invention.

As shown in FIG. 5, in this embodiment, the abnormality detecting steps S4-23, S4-24, and S4-25 for the maintaining process in FIG. 3 are performed as the steps S6-2, S6-3, and S6-4 after the start-up command is output in step S6-1. Also, in this embodiment, the lapse time T from the start of feeding of the material gas is replaced by counting from V=0 an integrated flow rate V of the material gas from the start of feeding of the material gas. The configuration of the hardware of the fuel cell system and the hydrogen generating apparatus 100 is identical to that of Embodiment 1, and will not be further described. In FIG. 5, the same steps as those in FIG. 3 are designated by the same reference numbers and will not be further described.

As shown in FIG. 5, after the sealing process (step S1) is completed, the hydrogen generating apparatus 100 transitions to the stop state. The controller 20 obtains the detected pressure P1 in step S3-1. In step S4-11, the controller 20 compares the detected pressure P1 to the first threshold M1. The controller 20 outputs a maintaining process command (step S4-12) to perform the maintaining process, when the detected pressure P1 is lower than the first threshold M1. Upon detecting the start-up command (step S6-1) after performing the maintaining process steps S3-1, S4-11, and S4-12 for preventing generation of a negative pressure inside the gas passage including the hydrogen generator 3, which is due to a temperature decrease in the hydrogen generator 3, the abnormality in the maintaining process is detected in the abnormality detecting steps S6-2 to S6-4 for the maintaining process. That is, the maintaining process steps S3-1, S4-11, and S4-12 are repeated until the start-up command is detected in step S6-1, but during this time, the abnormality detecting steps S6-2 to S6-4 for the maintaining process are not performed. Since repeating of the abnormality detecting steps S6-2 to S6-4 for the maintaining process is omitted, the control flow of the hydrogen generating apparatus 100 is simplified.

In step (material gas feeding process step) S7-2, the feeding of the material gas starts as in step S7-1. Then, counting of the integrated flow rate V after the feeding of the material gas starts.

The integrated flow rate V can be calculated based on a known fluid dynamics based on a material gas pressure in the material gas feeding passage 4 at upstream and downstream points in the vicinity of the material gas feeding device 10 and a cross-sectional area of the material gas feeding passage 4. For example, the integrated flow rate V is calculated by integrating the flow rates detected by a differential flow meter (not shown) provided in the material gas feeding passage 4.

If there is an abnormality flag in step S8, the combustion process step S11 is delayed until the integrated flow rate V reaches a predetermined air supply amount V1 in step (delay step) S9-2. In this case, as in step S1, the material gas may be diluted to a level less than the combustibility limit by using the air supply device of the combustor 5 and the diluted material gas may be discharged to outside.

The air supply amount V1 may be for a time taken for the event that the air which has entered the sealed area is discharged to outside through the combustor 5 and the gas reaching the combustor 5 has become a combustible state. Or, the air supply amount V1 may be desirably for a time which lapses until the feeding amount of the material gas reaches the amount required to purge the gas remaining in the sealed area. To be specific, the air supply amount V1 may be set to a volume of the gas passage inside the hydrogen generator 3. The air supply amount V1 is suitably set to an amount that is twice as large as the internal volume of the hydrogen generator 3. The air supply amount V1 is pre-input with the input unit 20C and pre-stored in the memory unit 20B.

When the integrated flow rate V after the start of feeding of the material gas reaches the predetermined air supply amount V1, the abnormality flag is reset in step S10 and the process moves to the combustion process step S11. In step S11, the integrated flow rate V is reset to zero and the counting is stopped. In this embodiment, since the air supply amount after the start of the material gas feeding process step S7-2 is directly detected, there is a high possibility that the combustion starts after the state where the material gas has become a surely combustible state in the combustor 5. Therefore, in the hydrogen generation apparatus 100 of the present invention, the possibility that the abnormality occurs in the combustion operation of the combustor in the start-up process is further reduced, enabling the combustion operation to be performed surely.

Embodiment 5

In Embodiment 5 of the present invention, in the fuel cell system of Embodiment 2, the abnormality in the maintaining process is distinguished to achieve correct operation of the hydrogen generating apparatus 100. The configuration of the hardware of the fuel cell system and the hydrogen generating apparatus 100 is identical to that of Embodiment 1, and will not be further described.

Figure 6:
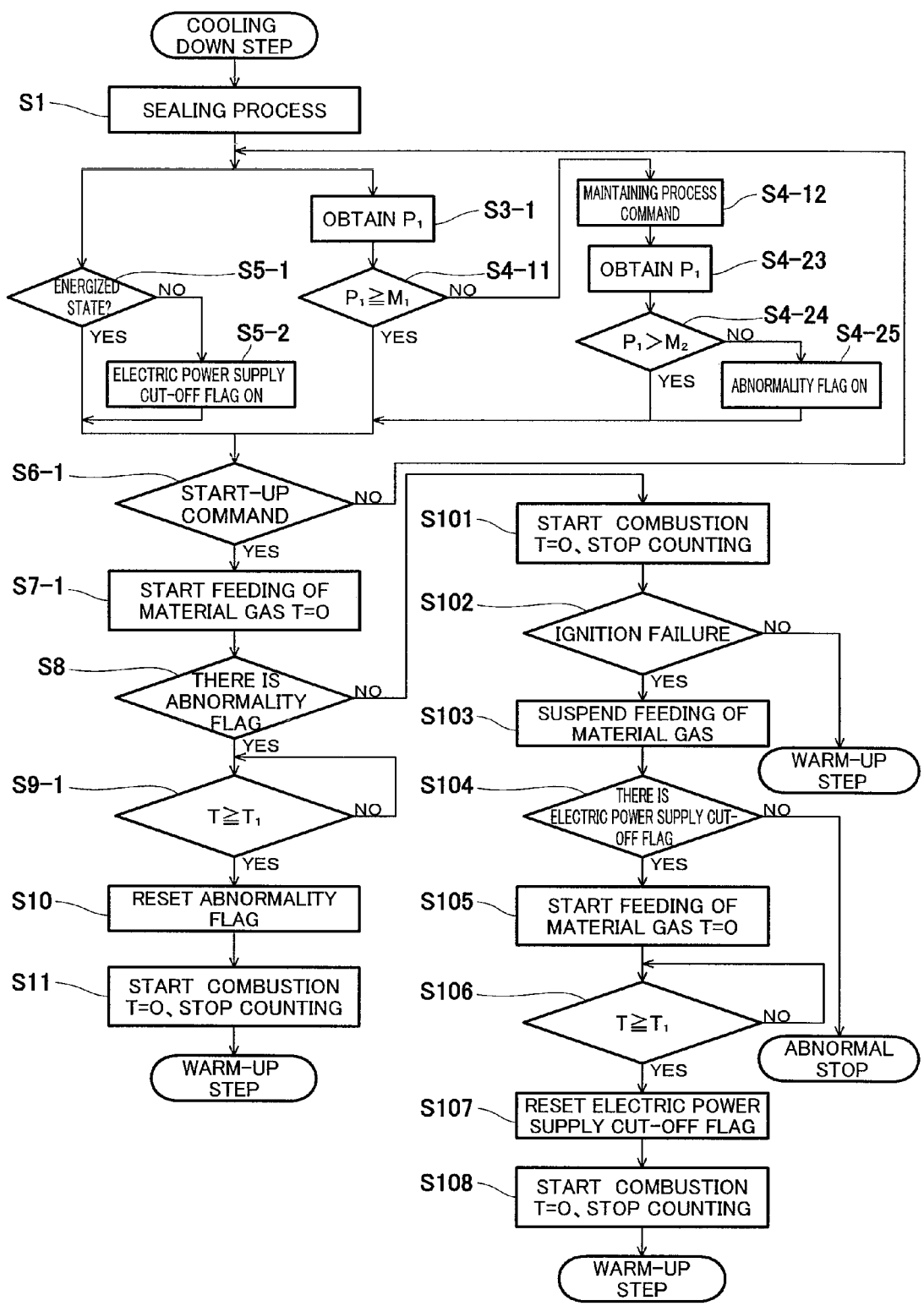
FIG. 6 is a flowchart showing an example of the operation during a stop period and the operation in a start-up process of a hydrogen generating apparatus according to Embodiment 5 of the present invention.

FIG. 6 is a flowchart showing an example of the operation of a stop process, the operation during a stop period and the operation in a start-up process of a hydrogen generating apparatus according to Embodiment 5. In FIG. 6, the same steps as those in FIG. 3 are designated by the same reference numbers as those in FIG. 3 and will not be further described. It should be noted that the steps S5-1 and S5-2 are identical to the steps S4-21 and S4-22 in Embodiment 3 (FIG. 4) except that "electric power supply cut-off flag" is used instead of "abnormality flag."

As shown in FIG. 6, after the stop process is completed in the sealing process step S1, the hydrogen generating apparatus 100 transitions to the stop state, and the steps S3-1, S4-11, S4-12, S4-23, S4-24, and S4-25 are performed as in Embodiment 2. Concurrently, after the sealing process step S1, the energized state of the hydrogen generating apparatus 100 is detected (energized state detecting step S5-1, S5-2). Then, based on the electric power failure information, the controller 20 causes the memory unit 20B to turn ON the electric power supply cut-off flag in step S5-2.

Then, the maintaining process steps and the abnormality detecting steps therefor S3-1, S4-11, S4-12, S4-23, S4-24, and S4-25 and the energized state detecting steps S5-1 and S5-2 are repeated until the start-up command is detected in step S6-1. Since the abnormality detecting steps S4-23 to S4-25 need not be repeated if the abnormality flag is in ON-state, the repeating of the steps S4-23 to S4-25 may be omitted.

Then, the controller 20 receives the start-up command (step S6-1). If the controller 20 detects there is an abnormality flag in step S8 after the material gas feeding device 10 starts feeding of the material gas (step S7-1), the delay step S9-1 is performed and then the combustion process step S11 is performed as in Embodiment 2.

On the other hand, if the controller 20 detects there is no abnormality flag in step S8, the lapse time T is reset to zero, the counting is stopped, and the combustor 5 starts combustion in the step (combustion process step) S101.

In this case, if the flame detector 13 detects there is no ignition failure of the material gas in step S102, then the hydrogen generating apparatus 100 transitions to the warm-up step as described in Embodiment 1. On the other hand, if the flame detector 13 detects the ignition failure of the material gas, the feeding of the material gas is stopped in step S103.

In step S104, the controller 20 checks whether or not there is an electric power supply cut-off flag. If there is no electric power supply cut-off flag, abnormal stop occurs. That is, the start-up fails.

At this time, the controller 20 causes the output unit 20D to display the ignition failure. Alternatively, the controller 20 may be configured to notify the remote spot that the ignition failure has occurred as described in step S11 in Embodiment 1.

On the other hand, if there is an electric power supply cut-off flag, counting of the lapse time T re-starts from T=0 and the feeding of the material gas re-starts in step (material gas process step) S105. Then, in step (delay step) S106, the combustion process step S108 is delayed until the lapse time T reaches the delay time T1. In this case, as in step S1, the material gas may be diluted to a level less than the combustibility limit by using the air supply device of the combustor 5 and the diluted material gas may be discharged to outside.

In the manner described above, the time when the combustor 5 re-starts the combustion after the feeding of the material gas re-starts is delayed with respect to the time when the combustor 5 re-starts the combustion in the case where there is no abnormality flag, the material gas is fed from the material gas feeding device 10 to the hydrogen generator 3 and the air assumed to have entered the off gas feeding passage 14 is discharged through the combustor 5 to reduce the air concentration in the off gas feeding passage 14 during the delay time T1. This reduces a possibility that ignition failure occurs if the ignition device 5A starts the ignition operation after a lapse of the delay time T1. After the lapse time T reaches the delay time T1, the electric power supply cut-off flag is reset in step S107.

If the ignition failure is detected in step S108, then the controller 20 suspends the start-up process and causes the output unit 20D to display the ignition failure as in step S11 described in Embodiment 1. Alternatively, the controller 20 may be configured to notify the remote spot that the ignition failure has occurred.

In the hydrogen generating apparatus 100 of the present invention, if the combustion cannot start normally even though the abnormality in the maintaining process is not detected based on the second threshold M2, the material gas feeding process is performed again based on whether or not the electric power supply is cut off, thereby enabling the start-up process in the hydrogen generating apparatus 100. That is, in the hydrogen generating apparatus 100 of the present invention, the air which has entered is discharged to atmosphere through the combustor 5 only when there is an abnormality in the maintaining process at the time of the electric power failure. This can omit the material gas feeding process for discharging the air which has entered the off gas feeding passage 14 every time the electric power failure occurs. As a result, maneuverability is surely improved and reduction of energy efficiency is suppressed.

Embodiment 6

Figure 7:
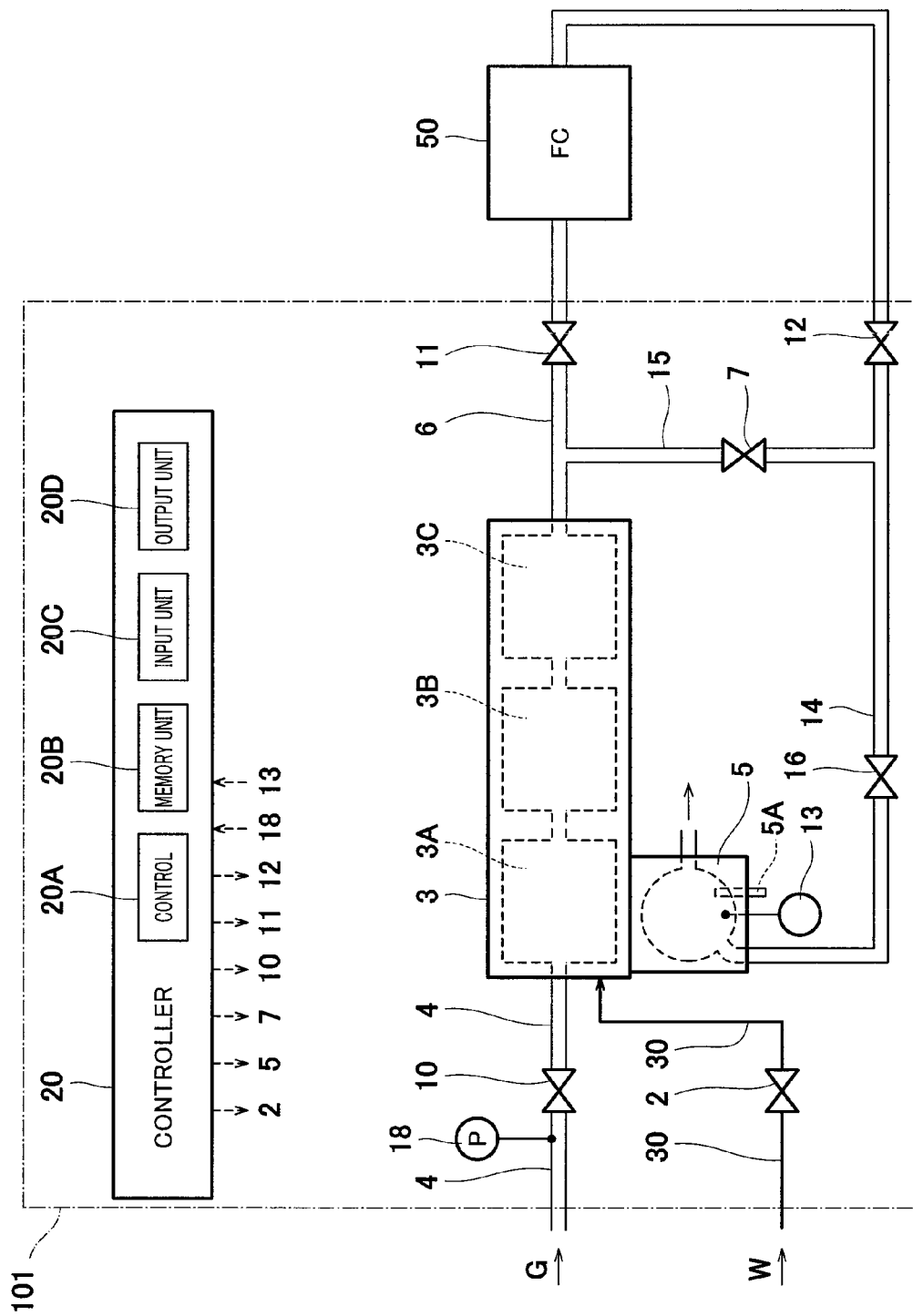
FIG. 7 is a schematic view showing a schematic configuration of a fuel cell system according to Embodiment 6 of the present invention.

FIG. 7 is a schematic view showing a schematic configuration of a fuel cell system according to Embodiment 6 of the present invention. As shown in FIG. 7, in a hydrogen generating apparatus 101 of Embodiment 6, a second pressure detector 18 is provided in a portion of the material gas feeding passage 4 which is located upstream of the material gas feeding device 10. The other configuration of the fuel cell system and the hydrogen generating apparatus 101 is identical to those of the fuel cell system and the hydrogen generating apparatus 100 in Embodiment 1 to Embodiment 4. Therefore, the same components are designated by the same reference numbers and will not be further described.

Figure 8:
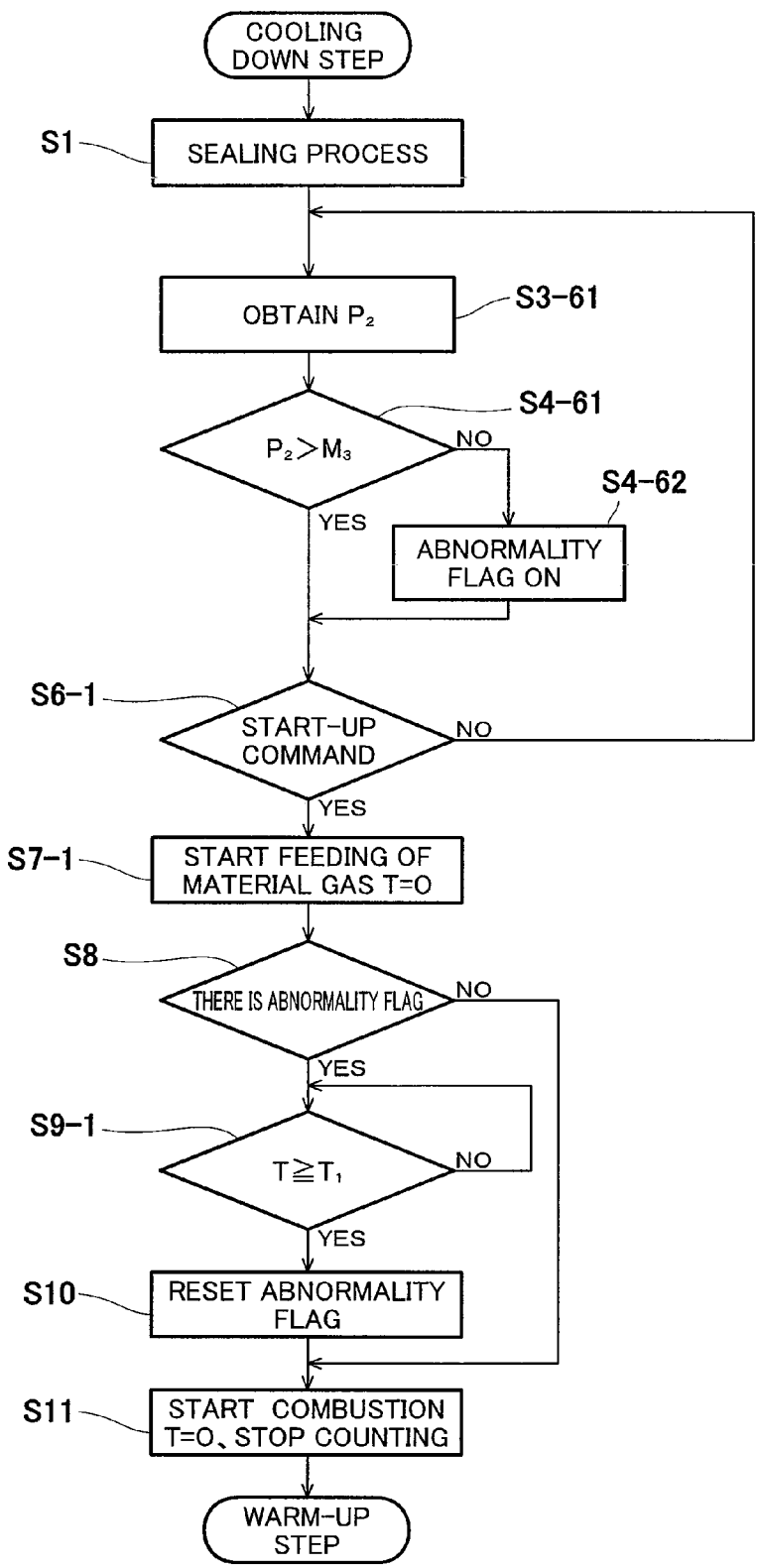
FIG. 8 is a flowchart showing an example of the operation during a stop period and the operation in a start-up process of the hydrogen generating apparatus of FIG. 7.

FIG. 8 is a flowchart showing an example of the operation of a stop process, the operation during a stop period and the operation in a start-up process of a hydrogen generating apparatus according to Embodiment 6. In FIG. 8, the same steps as those in FIG. 3 are designated by the same reference numbers as those in FIG. 3 and will not be further described. In this embodiment, the maintaining process steps and the abnormality detecting steps therefor S3-1, S4-11, S4-12, S4-23, S4-24, and S4-25 are replaced by steps S3-61, S4-61, and S4-62.

In this embodiment, the second pressure detector 18 detects the feeding pressure of the material gas feeding system, and a possibility that the maintaining process cannot be performed when the feeding pressure of the material gas feeding system is lower than a third threshold M3. Accordingly, in this embodiment, the abnormality in the maintaining process is detected based on the third threshold M3.

As shown in FIG. 8, after the stop process is completed in the sealing process step S1, the hydrogen generating apparatus 100 transitions to the stop state. In step S3-61, the controller 20 obtains a detected pressure P2 of the second pressure detector 18. In step S4-61, the controller 20 compares the detected pressure P2 to the third threshold M3. When the detected pressure P2 is the third threshold M3 or lower, in step S4-62, the controller 20 causes the memory unit 20B to turn ON the abnormality flag to store the abnormality in the maintaining process. In this manner, the abnormality in the maintaining process is detected based on the abnormality in the feeding pressure of the material gas feeding system.

The maintaining process is performed using at least either one of the pressure detector and the temperature detector inside the hydrogen generator 3 which are not shown. Or, the maintaining process steps S3-61, S4-61, and S4-62 may be performed without the pressure and temperature in the interior of the hydrogen generator 3. To be specific, the sealed area can be maintained by opening the material gas feeding device 10 for a specified time regularly at specified time intervals in the sealing process state. That is, the controller 20 is capable of maintaining the pressure in the interior of the sealed area by controlling the material gas feeding device 10 without the third threshold M3.

Embodiment 7

Figure 9:
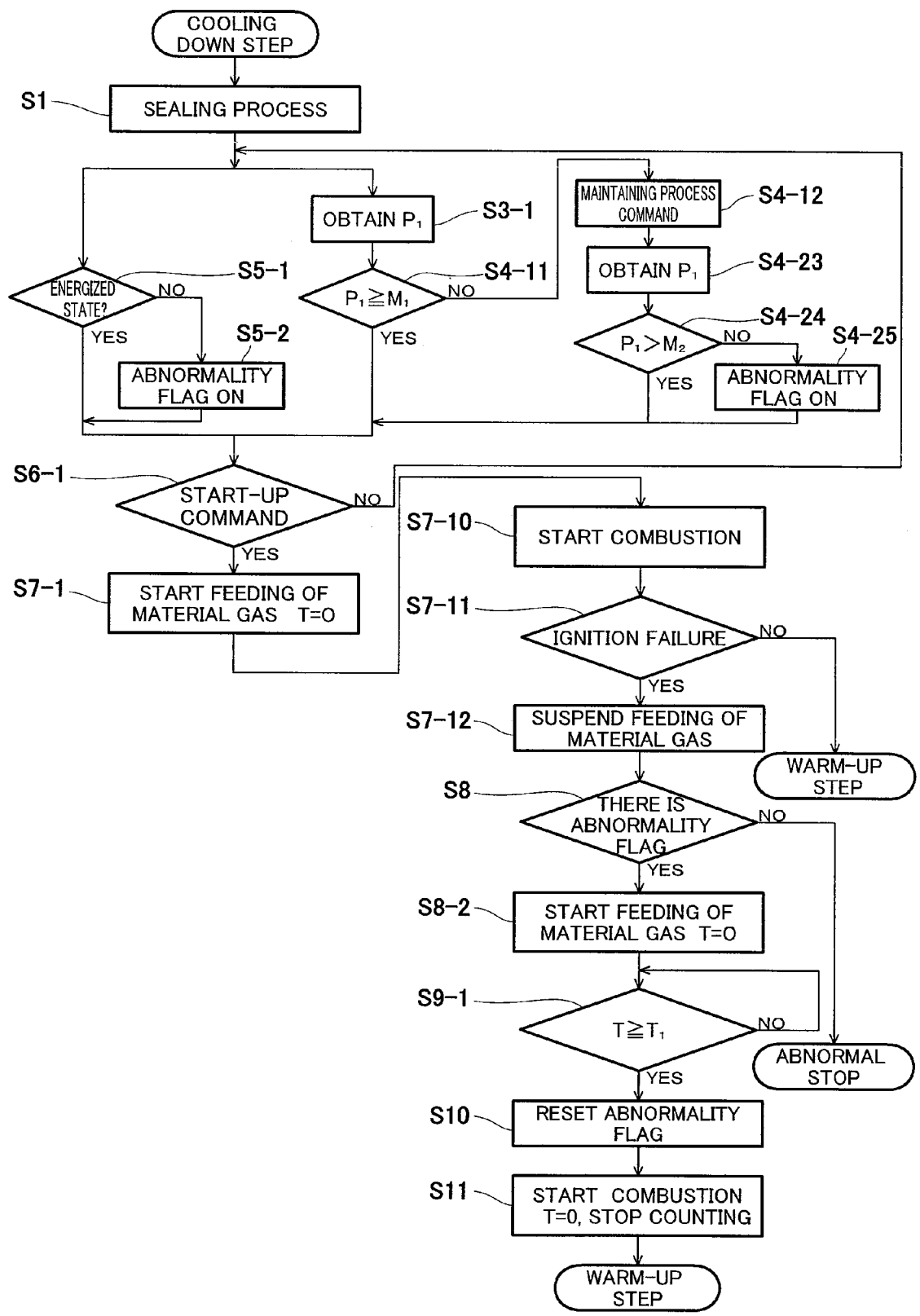
FIG. 9 is a flowchart showing an example of the operation during a stop period and the operation in a start-up process of a hydrogen generating apparatus according to Embodiment 7.

FIG. 9 is a flowchart showing an example of the operation during a stop period and the operation in a start-up process of a hydrogen generating apparatus according to Embodiment 7. In FIG. 9, the same steps as those in FIG. 6 are designated by the same reference numbers as those in FIG. 6 and will not be further described.

The step S6-1 in which the start-up command is output and the preceding steps are identical to those in FIG. 6. But, in step S5-2 in FIG. 9, "abnormality flag" is used instead of "electric power supply cut-off flag." That is, step S5-2 is identical to step S4-34 in Embodiment 3 (FIG. 4).

The controller 20 outputs a start-up command (step S6-1). The material gas feeding device 10 starts feeding of the material (step S7-1). Thereafter, the combustor 5 starts combustion in step S7-10 (combustion process step) S101. That is, in the first ignition operation in the start-up process, the material gas is fed to the hydrogen generator 3 with a flow rate which is equal to a flow rate in the case where there is no abnormality and the ignition device 5A starts the ignition operation at the same time that the ignition device 5A starts the ignition operation in the case where there is no abnormality.

If the flame detector 13 detects there is no ignition failure of the material gas in step S7-11, the hydrogen generating apparatus 100 transitions to the warm-up step as described in Embodiment 1. On the other hand, if the flame detector 13 detects the ignition failure of the material gas, the operation of the ignition device 5A is stopped and the feeding of the material gas from the material gas feeding device 10 is stopped in step S7-12. That is, the first ignition operation fails.

In step S8, the controller 20 checks whether or not there is an abnormality flag. If there is no abnormality flag, then abnormal stop occurs. That is, the start-up fails.

On the other hand, if there is an abnormality flag, counting of the lapse time T re-starts from T=0 and the feeding of the material gas re-starts in step (material gas process step) S8-2. Then, in step (delay step) S9-1, the combustion process step S11 is delayed until the lapse time T reaches the delay time T1. In this case, the delay time T1 may be desirably set to a time which lapses until the feeding amount of the material gas reaches the amount required to purge the gas remaining in the sealed area. To be specific, the delay time T1 may be set as described in Embodiment 1.

In the manner as described above, when the first ignition operation fails, the material gas feeding device 10 is controlled to re-start feeding of the material gas to the hydrogen generator 3, and the time when the ignition device 5A re-starts the ignition operation after the re-start of feeding of the material gas is delayed with respect to the time when the ignition device 5A re-starts the ignition operation in the case where there is no abnormality in the maintaining process. In such a configuration, the present invention is carried out only when the ignition failure is confirmed, and wasting of the material gas is lessened as compared to the case where the material gas is always fed with an amount larger than usual before the ignition operation after the abnormality in the maintaining process is detected. As a result, efficiency of the hydrogen generating apparatus is improved.

In this embodiment, in both of step S5-2 and step S4-25, the abnormality is detected based on the abnormality flag. However, one of the steps may be omitted and the abnormality may be detected based on the abnormality flag in the other of the steps.

Embodiment 8

In the above described embodiments, in the step (sealing process step) S1, the material gas is filled in the sealed area including the hydrogen generator 3, and then the sealed area is sealed. Alternatively, the present invention may be carried out in such a manner that the sealing process may be performed without filling the material gas in the sealed area. To be specific, in the configuration of this embodiment, the sealing process is performed under the state where the fuel gas is filled in the interior of the hydrogen generating apparatus, thereby completing the stop process, and the material gas is fed to the sealed area as desired to maintain the sealed state when the volume shrinks due to the temperature decrease in the hydrogen generating apparatus during the following stop period.

Hereinafter, only the stop process and the maintaining process during the stop period in the hydrogen generating apparatus of this embodiment will be described, and the other operation will not be described. The hydrogen generating apparatus of this embodiment is configured as being any one of the above embodiments, with regard to the operation during the stop period and the operation in the start-up process.

Initially, the controller 20 outputs a stop command. The material gas feeding device 10 and the water supply device 2 are closed to stop feeding of the material to the hydrogen generator 3 and supply of the water to the hydrogen generator 3.

When the temperature in the interior of the hydrogen generator 3 has decreased to a temperature at which carbon deposition does not occur if the material gas is fed thereto, the valve 11, the valve 12, and the valve 16 are closed to seal the sealed area including the hydrogen generator 3 in step S1. Thereby, area (sealed area) defined by the material gas feeding device 10, the valve 11, the valve 12 and the valve 16 including the hydrogen generator 3 is sealed under the state where the fuel gas is filled therein, completing the stop process.

During the stop period after the stop process, the hydrogen generator 3 has a temperature higher than outside temperature. Since the temperature of the hydrogen generator 3 decreases with a lapse of time, the volume of the gas in the interior of the sealed area shrinks. Accordingly, during the stop period which lapses until the temperature of the hydrogen generator 3 has decreased to the outside temperature after the stop process, the maintaining process is performed in such a manner that the material gas feeding device 10 is suitably controlled to feed the material gas to the sealed area so as to increase the pressure in the interior of the sealed area and the outside pressure up to the first threshold M1 or higher and the increased pressures are maintained.

Even after the temperature of the hydrogen generator 3 has decreased to the outside temperature, the volume of the gas in the interior of the sealed area may in some cases shrink due to some factors such as fluctuation in the outside temperature. Accordingly, during the stop period after the temperature of the hydrogen generator 3 has decreased to the outside temperature, the maintaining process is performed.

Thus far, the embodiments of the present invention have been described. However, the present invention is not limited to the above embodiments. From the foregoing, numerous alternations and other embodiments are obvious to those skilled in the art.

In Embodiment 1 to Embodiment 8 described above, the stop period of the present invention is a period which lapses from the sealing process for the hydrogen generating apparatus is performed until the controller 20 outputs the start-up command, and the maintaining process of the present invention is the maintaining process during the stop period. Alternatively, the stop period in the present invention may be a period which lapses from when the hydrogen generator 3 is sealed and the temperature of the hydrogen generator 3 has decreased to the outside temperature until the controller 20 outputs the start-up command. In this case, the feeding process of the material gas during the period from when the sealing process for the hydrogen generator 3 is performed until the temperature of the hydrogen generator 3 has decreased to the outside temperature is excluded from the maintaining process of the present invention.

In the above embodiments, the valve 16 provided in the portion of the off gas feeding passage 14 which is located between the bypass passage 15 and the combustor 5 corresponds to the valve of the present invention. However, the combustible gas feeding passage and the valve of the present invention are not limited to the off gas feeding passage 14 and the valve 16 in the above embodiments.

The combustible gas feeding passage of the present invention includes all of the gas passages extending out from the hydrogen generator 3 and reaching the combustor 5. The combustible gas feeding passage of the present invention also includes the fuel gas feeding passage 6 and the bypass passage 15 in the above embodiments. The valve which is closed at the most upstream side relative to the combustor 5 in the sealing process, among the valves provided in these passages, corresponds to the valve of the present invention. In other words, the valves provided in the fuel gas feeding passage 6 and the bypass passage 15 in the above embodiments correspond to the valve of the present invention so long as they are closed at the most upstream side relative to the combustor 5 in the sealing process.

INDUSTRIAL APPLICABILITY

A hydrogen generating apparatus of the present invention, which is sealed under the state where a combustible gas is filled therein during a stop period and the sealed combustible gas is combusted in a start-up process, is useful as a hydrogen generating apparatus which is capable of reducing a possibility that an abnormality occurs in a combustion operation in a combustor in a start-up process even if an abnormality occurs in a maintaining process for maintaining a sealed state by feeding the material gas as desired, a method of operating the hydrogen generating apparatus, and a fuel cell system using the hydrogen generating apparatus.

The invention claimed is:

1. A method of operating a hydrogen generating apparatus, the hydrogen generating apparatus comprising:
   a reformer configured to generate a hydrogen-containing gas from a material gas through a reforming reaction;
   a material gas feeding passage through which the material gas is fed to the reformer;
   a material gas feeding device which is provided on the material as feeding passage and is configured to control feeding of the material gas to the reformer;
   a combustor configured to combust a gas discharged from the reformer;
   an ignition device provided in the combustor;
   a combustible gas feeding passage through which the gas discharged from the reformer is fed to the combustor;
   a valve provided in the combustible gas feeding passage; and
   a gas passage located between the material gas feeding device and the valve, the method comprising steps of:
   during a stop period which is a period from a time when the valve is closed and the hydrogen generating apparatus is sealed to a start-up time of the hydrogen generating apparatus, performing a maintaining process in such a manner that the material gas feeding device feeds the material gas to the gas passage, to maintain a pressure in an interior of the gas passage at a value which is not smaller than a first threshold which is an atmospheric pressure or larger; and
   when an abnormality in the maintaining process is detected, feeding the material gas to the gas passage with an amount which is larger than an amount when there is no abnormality in the maintaining process, during a period which lapses from when the abnormality is detected until the ignition device starts an ignition operation in a start-up process.

2. The method according to claim 1, wherein when the abnormality in the maintaining process is detected, the material gas feeding device feeds the material gas to the reformer and the ignition device starts the ignition operation at a time later than a time when the ignition device starts the ignition operation in a case where there is no abnormality in the maintaining process in the start-up process.

3. The method according to claim 1, wherein when the abnormality in the maintaining process is detected, the material gas feeding device feeds the material gas with an amount required to purge a gas remaining in the gas passage during a period from when the abnormality is detected until the ignition device starts the ignition operation in the start-up process.

4. The method according to claim 1, wherein when an ignition failure in a first ignition operation of the ignition device in the start-up process is detected and the abnormality in the maintaining process is detected, the material gas feeding device feeds the material gas with an amount which is larger than an amount in the case where there is no abnormality in the maintaining process during a period which lapses from when the ignition device stops the ignition operation due to the ignition failure until the ignition device re-starts the ignition operation.

5. The method according to claim 4, wherein when the ignition failure in the first ignition operation is detected and the abnormality in the maintaining process is detected, the material gas feeding device feeds the material gas to the reformer and the ignition device re-starts the ignition operation at a time later than a time when the ignition device re-starts the ignition operation in the case where there is no abnormality in the maintaining process.

6. The method according to claim 1, comprising the step of:
detecting the pressure in the interior of the gas passage by using a first pressure detector,
wherein the abnormality in the maintaining process is an abnormality occurring in the pressure detected by the first pressure detector during the stop period.

7. The method according to claim 1, comprising the step of:
detecting the pressure in the interior of the gas passage by using a first pressure detector,
wherein the abnormality in the maintaining process is that the pressure detected by the first pressure detector continues to be lower than the first threshold for a predetermined determination time or longer during the stop period.

8. The method according to claim 1, comprising the step of:
detecting the pressure in the interior of the gas passage by using a first pressure detector,
wherein the abnormality in the maintaining process is that the pressure detected by the first pressure detector is not higher than a second threshold during the stop period, the second threshold being a value which is not smaller than an atmospheric pressure and is smaller than the first threshold.

9. The method according to claim 1, comprising the step of:
detecting the pressure in the interior of the gas passage by using a first pressure detector,
wherein the abnormality in the maintaining process is that the pressure detected by the first pressure detector is not higher than a second threshold after a start-up command is generated, the second threshold being a value which is not smaller than an atmospheric pressure and is smaller than the first threshold.

10. The method according to claim 1, comprising the step of:
detecting a pressure in an interior of a portion of the material gas feeding passage which is located upstream of the material gas feeding device in a flow direction of the material gas by using a second pressure detector,
wherein the abnormality in the maintaining process is that the pressure detected by the second pressure detector has an abnormality during the stop period.

11. The method according to claim 1, wherein the abnormality in the maintaining process is that electric power supply is cut off at least for a time in the stop period.

12. A method of operating a fuel cell system comprising the steps of:
generating a hydrogen-containing gas after the method according to claim 1; and
generating electric power using the hydrogen-containing gas supplied to a fuel cell from the hydrogen generating apparatus.

13. The method according to claim 12, wherein the combustible gas feeding passage is a passage through which an anode off gas is fed from the fuel cell to the combustor.

* * * * *